US012090105B2

(12) United States Patent
Faussett

(10) Patent No.: US 12,090,105 B2
(45) **Date of Patent: *Sep. 17, 2024**

(54) MASSAGE DEVICE AND SYSTEM

(71) Applicant: POLAR FUSION LLC, Kent, WA (US)

(72) Inventor: Spring S. Faussett, Kent, WA (US)

(73) Assignee: Polar Fusion LLC, Kent, WA (US)

( * ) Notice: Subject to any disclaimer, the term of this patent is extended or adjusted under 35 U.S.C. 154(b) by 272 days.

This patent is subject to a terminal disclaimer.

(21) Appl. No.: 17/370,132

(22) Filed: Jul. 8, 2021

(65) Prior Publication Data

US 2021/0330539 A1 Oct. 28, 2021

Related U.S. Application Data

(63) Continuation of application No. 15/501,429, filed as application No. PCT/US2015/044078 on Aug. 6, 2015, now Pat. No. 11,077,008.

(60) Provisional application No. 62/076,031, filed on Nov. 6, 2014, provisional application No. 62/057,993, filed on Sep. 30, 2014, provisional application No. 62/033,776, filed on Aug. 6, 2014.

(51) Int. Cl.

| | |
|---|---|
| ***A61H 1/00*** | (2006.01) |
| ***A61H 7/00*** | (2006.01) |
| ***A61H 15/00*** | (2006.01) |
| ***A63B 39/00*** | (2006.01) |

(52) U.S. Cl.

CPC ............. *A61H 1/008* (2013.01); *A61H 7/001* (2013.01); *A61H 15/00* (2013.01); *A63B 39/00* (2013.01); *A61H 2015/0014* (2013.01); *A61H 2201/0107* (2013.01); *A61H 2201/168* (2013.01); *A61H 2201/1685* (2013.01); *A63B 2039/003* (2013.01)

(58) Field of Classification Search

CPC ................ A61H 39/00; A61H 2205/00; A61H 2015/0007–0057; A61H 1/008; A61H 7/001; A61H 15/00; A61H 2201/1685; A61H 2015/0014; A61H 7/003; A61H 39/04; A61H 2201/0157; A61H 2201/1269; A63B 26/003; A63B 2039/003; A63B 39/08; A63B 2225/05; A63B 71/023; A63B 41/125; A63B 21/00047

USPC ....... 411/403, 402, 373, 372, 371, 919, 374, 411/910, 103, 105, 107, 353, 999, 429, 411/431; 601/56, 63, 91, 102, 110, 124

See application file for complete search history.

(56) References Cited

U.S. PATENT DOCUMENTS

| | | | |
|---|---|---|---|
| 1,981,379 A | 11/1934 | Thomson et al. | |
| 2,991,586 A | 7/1961 | Cobb | |
| 3,356,367 A | 12/1967 | Tewksbury | |
| 3,368,554 A * | 2/1968 | Hwa | A45D 24/42 15/184 |
| 3,636,946 A | 1/1972 | Hardy | |
| 4,126,129 A | 11/1978 | Rainbow | |

(Continued)

*Primary Examiner* — Justine R Yu
*Assistant Examiner* — Alexander Morales
(74) *Attorney, Agent, or Firm* — Seed IP Law Group LLP

(57) ABSTRACT

A massage kit having a foam roller, a massage device, and a removable cover. The massage device includes a flat bottom surface with a curved top surface. Protrusions extend from the massage device and are configured to interact with the removable cover to hold the cover in place on the top surface or the bottom surface of the massage device. The roller includes an opening sized and dimensioned to receive the massage device.

9 Claims, 38 Drawing Sheets

(56) References Cited

U.S. PATENT DOCUMENTS

| | | | | |
|---|---|---|---|---|
| 4,196,722 | A | 4/1980 | Vanderwoude | |
| 4,589,880 | A | 5/1986 | Dunn et al. | |
| 4,801,140 | A | 1/1989 | Bergeron | |
| 5,048,823 | A * | 9/1991 | Bean | A63B 22/18 482/146 |
| 5,074,730 | A | 12/1991 | Duran | |
| 5,154,678 | A * | 10/1992 | Adamczyk | A63B 23/0458 482/52 |
| 5,554,102 | A | 9/1996 | Chiou | |
| 5,833,587 | A | 11/1998 | Strong et al. | |
| 6,135,972 | A | 10/2000 | Kuo | |
| 6,228,001 | B1 | 5/2001 | Johnson et al. | |
| 6,478,756 | B1 * | 11/2002 | Chen | A47K 7/026 601/134 |
| 6,575,885 | B1 | 6/2003 | Weck et al. | |
| 6,719,676 | B1 * | 4/2004 | Hsu | A63B 21/0004 482/121 |
| 6,740,008 | B1 * | 5/2004 | Ho | A63B 22/18 482/79 |
| 6,945,919 | B2 * | 9/2005 | Yang | A63B 22/18 482/141 |
| 7,485,102 | B2 | 2/2009 | Zake | |
| 7,575,540 | B1 * | 8/2009 | Dobrow | A63B 21/0004 482/142 |
| 8,382,647 | B1 * | 2/2013 | Hodes | A63B 21/072 482/141 |
| D698,035 | S | 1/2014 | Turner | |
| 8,814,768 | B1 | 8/2014 | Yang et al. | |
| 9,011,295 | B2 * | 4/2015 | Orenstein | A63B 23/0458 482/52 |
| 9,108,086 | B1 * | 8/2015 | Weck | A63B 21/072 |
| 11,077,008 | B2 * | 8/2021 | Faussete | A61H 15/00 |
| 2002/0072702 | A1 | 6/2002 | Quay | |
| 2002/0193714 | A1 | 12/2002 | Pecora | |
| 2003/0125174 | A1 | 7/2003 | Lin | |
| 2004/0006292 | A1 | 1/2004 | Joseph et al. | |
| 2005/0049532 | A1 | 3/2005 | Lee | |
| 2005/0085749 | A1 | 4/2005 | Baerwalde et al. | |
| 2005/0197602 | A1 * | 9/2005 | Kwen | A61H 7/001 601/134 |
| 2005/0222525 | A1 | 10/2005 | Muchisky | |
| 2007/0249975 | A1 | 10/2007 | Pan et al. | |
| 2008/0039747 | A1 | 2/2008 | Baerwalde et al. | |
| 2009/0215596 | A1 | 8/2009 | Obermaier | |
| 2010/0160125 | A1 | 6/2010 | Strong | |
| 2010/0317496 | A1 | 12/2010 | Abranchess | |
| 2011/0152035 | A1 | 6/2011 | Wahl | |
| 2013/0023392 | A1 * | 1/2013 | Glickfield | A63B 17/04 482/142 |
| 2013/0090220 | A1 | 4/2013 | Bertram et al. | |
| 2013/0123676 | A1 | 5/2013 | Fallstich | |
| 2013/0178766 | A1 | 7/2013 | Abdur-Raoof | |
| 2013/0178768 | A1 | 7/2013 | Dalebout et al. | |
| 2013/0228979 | A1 | 9/2013 | Griffiths | |
| 2013/0231594 | A1 | 9/2013 | Bennett | |
| 2013/0261517 | A1 | 10/2013 | Rodgers | |
| 2013/0316886 | A1 | 11/2013 | Lynch et al. | |
| 2013/0324382 | A1 | 12/2013 | Wilson | |
| 2014/0088352 | A1 | 3/2014 | Maurette | |
| 2014/0128786 | A1 | 5/2014 | Ross | |
| 2014/0329044 | A1 | 11/2014 | Fantin | |
| 2014/0358045 | A1 | 12/2014 | Toto | |
| 2015/0111705 | A1 | 4/2015 | Walker et al. | |
| 2015/0150758 | A1 * | 6/2015 | Turnbow-Faraci | A47K 7/03 601/138 |
| 2015/0223970 | A1 | 8/2015 | Holland | |
| 2016/0114208 | A1 * | 4/2016 | Trenkle | A63B 22/20 482/79 |

* cited by examiner

MASSAGE DEVICE AND SYSTEM

CROSS REFERENCE TO RELATED APPLICATIONS

This application is a continuation application of U.S. non-provisional application Ser. No. 15/501,429 filed Feb. 2, 2017, which is a non-provisional application of U.S. provisional application No. 62/033,776, filed Aug. 6, 2014, U.S. provisional application Ser. No. 62/057,993, filed Sep. 30, 2014, and U.S. provisional application No. 62/076,031, filed Nov. 6, 2014, each of which is hereby incorporated herein by reference in its entirety.

BACKGROUND

Technical Field

The present disclosure is directed to a massage device and system designed to facilitate both hands-free and hand-holdable use as an individual device and in combination with other massage tools.

Description of the Related Art

Numerous massage tools are available in the marketplace that address a variety of needs in manipulation of the muscles, tendons, and ligaments. Included among these tools are large foam rollers on which the user rests their body and roll across a supporting surface. These rollers can require a substantial amount of floor space as the user rolls their body along the roller and the roller moves along the floor. Their size also makes it difficult to direct the pressure into hard-to-reach areas.

BRIEF SUMMARY

The present disclosure is directed to a device and system that enables a user to manually control the point of pressure or to use the device and system in a hands-free mode. In addition, the device combines an appealing appearance with the ability to utilize multiple accessories or other massage devices to enhance the massage experience.

In one implementation of the present disclosure a kit is provided that includes a foam roller, a massage device having a body with a first substantially flat surface and a second curved surface that extends upward away from the first surface, and one or more protrusions that extend from the body. The kit includes a removable, stretchable cover that has openings sized and shaped to couple to the protrusions. The roller includes an opening sized and dimensioned to receive the massage device. The body has a firm top portion and a flexible bottom portion, the protrusions extending from the bottom portion, the bottom portion being configured to conform to a curvature of the foam roller. In addition, the body includes a plurality of grooves and a plurality of extensions, the grooves having a widest portion adjacent to the first flat surface and having a tapered end closer to a top point of the massage device.

In another implementation of the present disclosure a massage device is provided that includes a main body having a bottom end portion and a shape comprising a dome, a peripheral ridge extending laterally outward from the bottom end portion of the main body, and a base portion including an outer lip having a vertical portion and a horizontal portion that extends radially inward from the vertical portion, the outer lip of the base portion configured to engage the peripheral ridge of the main body to secure the base portion to the main body.

In some implementations, the main body includes a bottom surface and a recess formed in the bottom surface, and the base portion includes a top surface and a protrusion extending from the top surface. In some implementations, the recess has a cross-sectional shape comprising a rectangle. In some implementations, the protrusion has a cross-sectional shape comprising an elongate strip and three relatively short strips that intersect and are perpendicular to the elongate strip. In some implementations, the protrusion is positioned within the recess and the protrusion is frictionally engaged with outer walls of the recess. In some implementations, when the protrusion is positioned within the recess, the base portion is frictionally secured to the main body. Some implementations further include an adhesive that secures the main body to the base portion. In some implementations, the base portion includes a central opening and an inner lip surrounding the central opening. In some implementations, the inner lip is shorter than the outer lip.

In another implementation of the present disclosure a massage device kit is provided that includes a main body having a bottom end portion and a shape comprising a dome, a peripheral ridge extending laterally outward from the bottom end portion of the main body, a first base portion including a first outer lip and a first bottom surface having a first coefficient of friction, the first outer lip configured to engage the peripheral ridge to secure the first base portion to the main body, and a second base portion including a second outer lip and a second bottom surface having a second coefficient of friction different from the first coefficient of friction, the second outer lip configured to engage the peripheral ridge to secure the second base portion to the main body.

In some implementations, the main body includes a bottom surface and a recess formed in the bottom surface, the first base portion includes a first top surface and a first protrusion extending from the first top surface, and the second base portion includes a second top surface and a second protrusion extending from the second top surface. In some implementations, when the first protrusion is positioned within the recess, the first base portion is frictionally secured to the main body and when the second protrusion is positioned within the recess, the second base portion is frictionally secured to the main body. In some implementations, the first base portion includes a first central opening and a first inner lip surrounding the first central opening, and the second base portion includes a second central opening and a second inner lip surrounding the second central opening.

In another implementation of the present disclosure a method of assembling a massage device is provided that includes inserting a peripheral ridge extending laterally outward from a bottom end portion of a dome-shaped main body of the massage device into an outer lip of a base portion, the outer lip including a vertical portion and a horizontal portion coupled to the vertical portion, setting the main body down on the base portion so that an outer surface of the bottom end portion is bounded by the outer lip of the base portion, and manipulating the outer lip of the base portion so the horizontal portion of the outer lip covers the entirety of the peripheral ridge of the main body.

In some implementations, the method further includes using the massage device to perform a massage. In some implementations, manipulating the outer lip of the base portion so the horizontal portion of the outer lip covers the entirety of the peripheral ridge of the main body secures the base portion to the main body. In some implementations, setting the main body down on the base portion comprises setting the main body down on the base portion so that an inner surface of the bottom end portion is bounded by an inner lip of the base portion. In some implementations, the method further includes selecting the base portion from a first base portion including a first bottom surface having a first coefficient of friction and a second base portion including a second bottom surface having a second coefficient of friction. In some implementations, the selecting is based on a third coefficient of friction of a surface on which the massage device is to be used.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

Figure 1A:
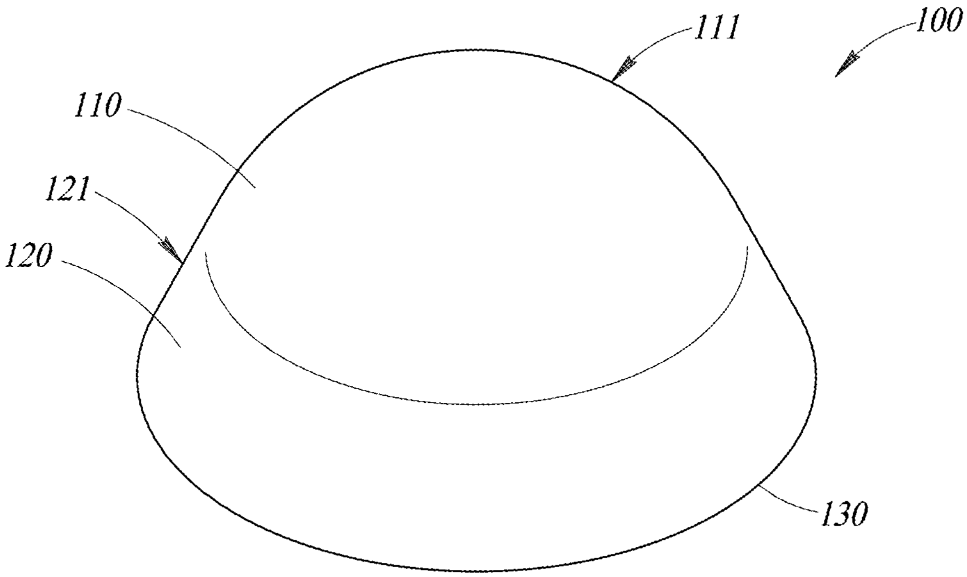
FIG. 1A is a pictorial view of a massage device according to one implementation of the present disclosure.

In the following description, certain specific details are set forth in order to provide a thorough understanding of various implementations of the disclosure. However, one skilled in the art will understand that the disclosure can be practiced without these specific details. In other instances, well-known structures associated with manufacturing techniques have not been described in detail to avoid unnecessarily obscuring the descriptions of the implementations of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics can be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

As used in the specification and appended claims, the use of "correspond," "corresponds," and "corresponding" is intended to describe a ratio of or a similarity between referenced objects. The use of "correspond" or one of its forms should not be construed to mean the exact shape or size.

In the drawings, identical reference numbers identify similar elements or acts. The size and relative positions of elements in the drawings are not necessarily drawn to scale.

The present disclosure is directed in part to a massage device 100 that is configured to be used to massage or otherwise provide user-controlled body weight pressure to the user's muscles, ligaments, and tendons as well as other areas of the body. For example, the user can place the massage device 100 on a floor and then position their muscle, such as their quadriceps, on a curved top 110 of the massage device 100. The user can apply a specific amount of pressure on the curved top 110 in a fixed position or move their muscle across the curved top 110. This massage device 100 is a stationary massager as opposed to known foam rollers that move beneath a user as the user moves. This stationary roller remains stationary on a surface while a user slides or moves along a top surface of the device to massage the user's selected muscle, tendon, or other body part. This allows the user control application of pressure to the selected body part.

With reference to FIGS. 1A-1E, the massage device 100 includes the curved top 110, a sidewall 120, and a bottom surface 130. The top 110 is configured to facilitate massaging muscles and other body tissues. The top 110 includes a top surface 111 that has a curvature. For example, the curvature can be a spherical shape or a dome shape that provides for muscle penetration when a muscle is pressed against the massage device 100. The top 110 can have another shape or shapes that facilitate massaging muscles or other body tissues. For example, the top 110 can have a narrower radius of curvature or a wider radius of curvature.

Figure 1B:
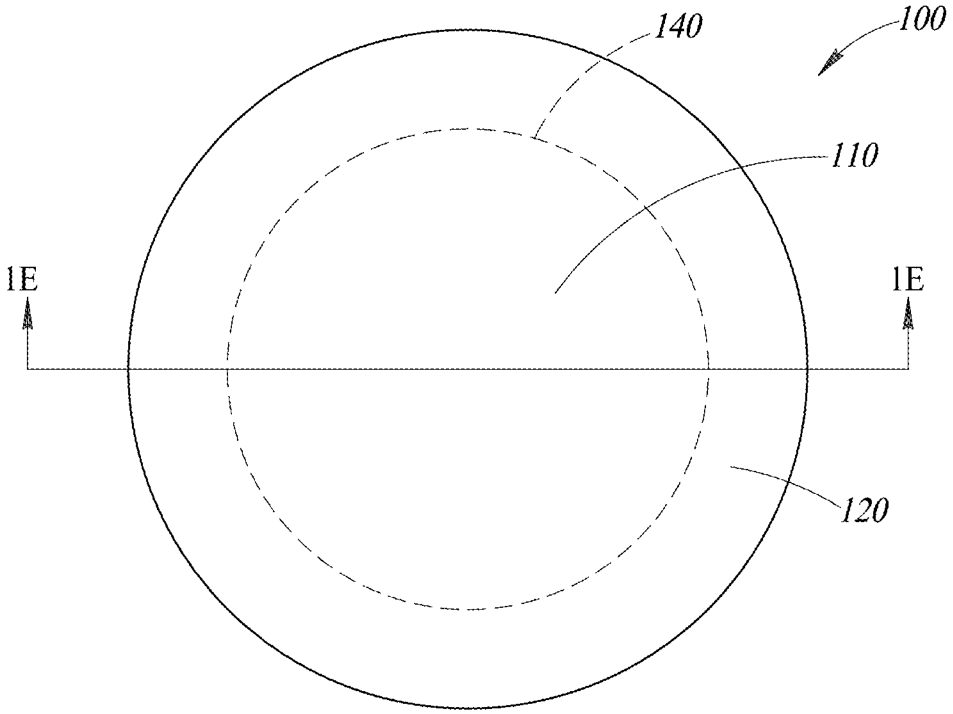
FIG. 1B is a top view of the massage device of FIG. 1A.
Figure 1C:
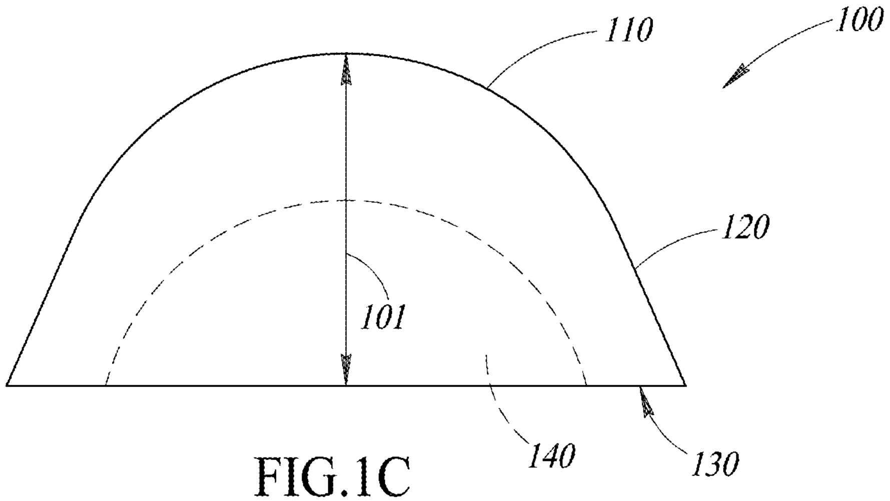
FIG. 1C is a side view of the massage device of FIG. 1A.

The sidewall 120 has a substantially flat outer surface 121, as shown in FIG. 1C. The sidewall 120 merges or otherwise smoothly blends with the top 110. The top 110 has a consistent radius of curvature while the sidewall 120 has a flat or otherwise straight surface. With respect to a surface on which the massage device 100 rests, the sidewall 120 is at a consistent angle, which is less than 90 degrees to the supporting surface. In some implementations, the angle can be 30 degrees to 55 degrees to the supporting surface. The massage device has a graduated curvature as the sidewalls 120 transition from the bottom surface 130 to the curved top 110. A portion of the sidewall is steeper closer to the bottom surface than a portion of the sidewall closer to the top.

As shown in FIG. 1C, the outer surface 121 can have a truncated cone shape. The sidewall 120 and the outer surface 121 can transition to the top 110 and transition to the bottom surface 130. The bottom surface 130 is substantially flat and acts as a base to support the massage device 100 when in use and when not in use. The bottom surface 130, in conjunction with a type of material used to form the massage device, can support the force of a user using the massage device 100. The material can be a resilient plastic, a rigid plastic, rubber, or other suitable material to support and maintain shape while being compliant, permitting it to be compressed by the weight of the user. The material can also be an open cell foam or styrene, butadiene rubber, open cell styrene-butadiene, neoprene, silicon rubber, leather, cork, polyethylene foam, and silicone, to name a few. The material is a resilient material that is subtly compressible when the user applies pressure and returns to its original shape when the user removes pressure.

The bottom surface 130 can be a textured surface configured to provide resistance to slipping during use. For example, if the user places this device on the floor to use in a hands-free mode, the bottom surface is configured to temporarily adhere to or grip the floor to prevent the device from moving when the user applies pressure downward or in a side-to-side movement. In particular, if the user is positioned in a push-up position with one of their quadriceps on the device, the user can slide over the top surface 111 towards and away from their hands. As they slide, the device will stay in place to allow controlled user massage.

When using the massage device 100 in a hands-free mode, the user places the massage device 100 on a floor or other horizontal surface, such as a table or desk. The floor or other horizontal surface can have a carpet covering, tile covering, or other types of floor covering. The bottom surface is configured to grip or otherwise prevent slippage of the massage device during use. If the device is placed on a desk, the user can press their forearm onto the massage device 100 to release tension, such as tension caused by carpal tunnel syndrome or other ailments. For example, to massage the forearm muscles the user positions the portion of their arm closest to the elbow on top of the massage device 100 and use their body weight to push the massage device into their forearm muscle.

In some implementations, the user can place the massage device on a wall or other vertical surface. For example, to massage back muscles, a user can hold the massage device 100 against a wall and then lean their back against the massage device 100. The user can use a combination of body weight and strength to push their back muscles against the massage device 100. In some implementations, a user can place and use the massage device 100 on an inclined surface. A horizontal or inclined surface can have a concrete, paint, drywall, workout mat or other surface covering.

As described above, the bottom surface 130 can be placed on surfaces at numerous angles and with a variety of surfaces. Therefore, the bottom surface 130 can have various finishes, textures, or other means for gripping or attaching to surfaces or resisting movement on those surfaces. The bottom surface 130 can include a layer of one or more lower density rubber composites including open cell styrene, butadiene rubber, open cell styrene-butadiene, neoprene, silicon rubber, leather, cork, polyethylene foam, silicone, or other material.

Figure 1D:
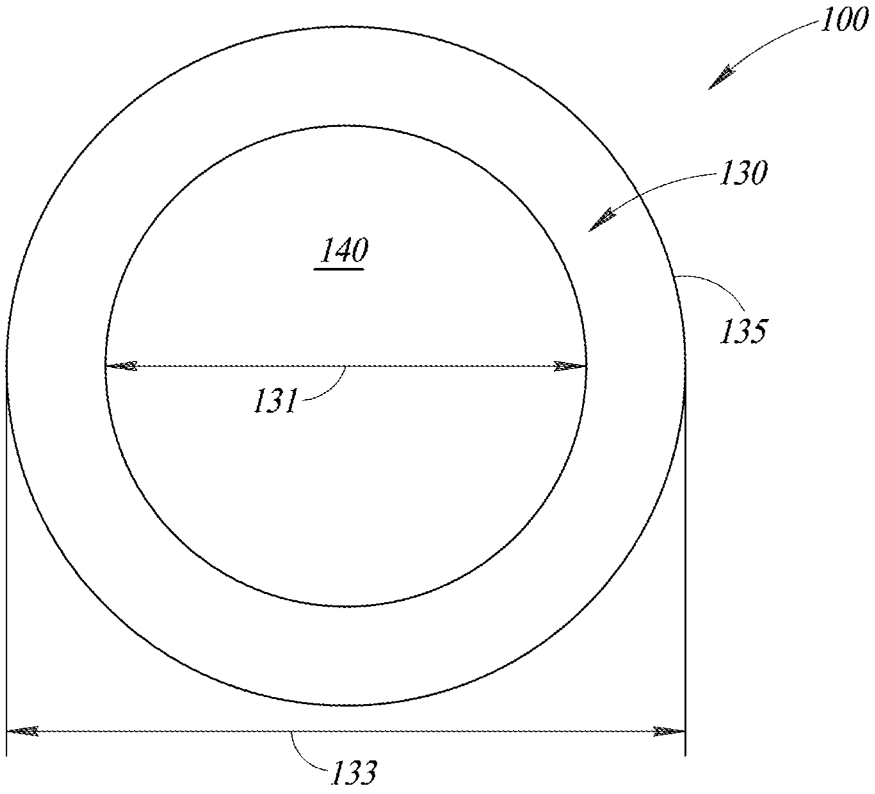
FIG. 1D is a bottom view of the massage device of FIG. 1A.
Figure 1E:
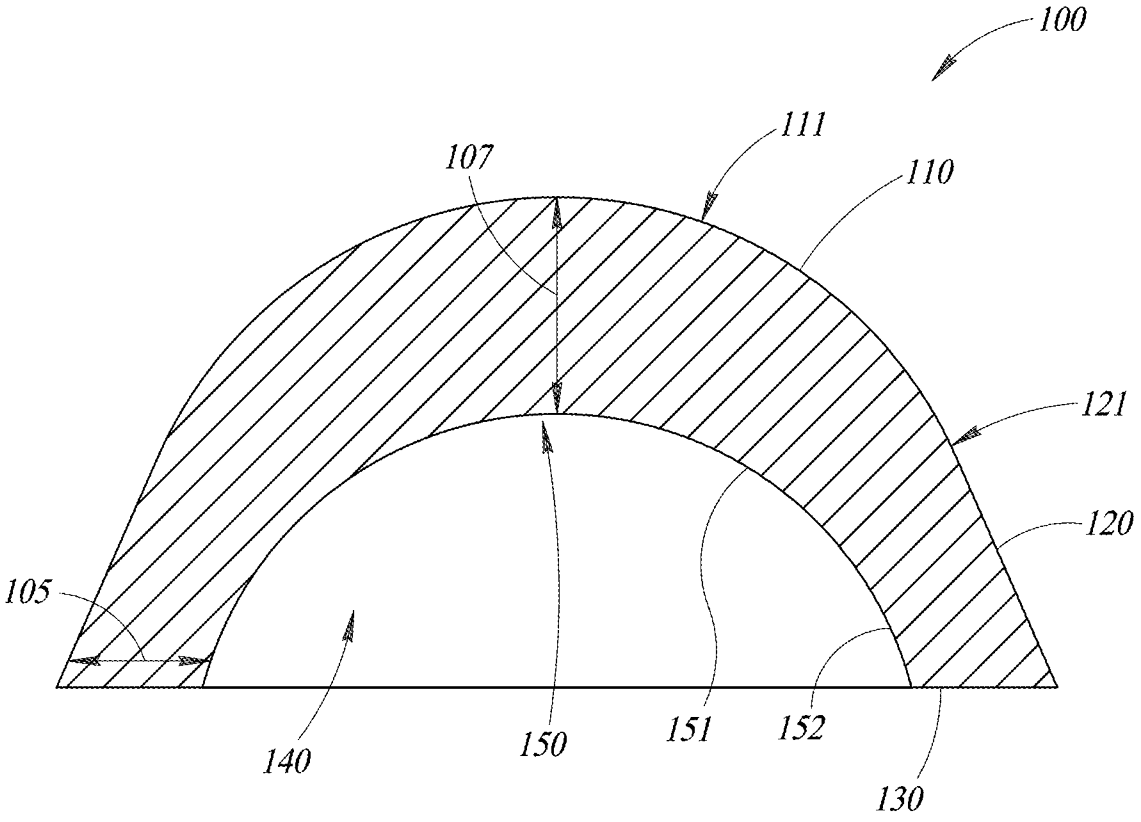
FIG. 1E is a cross section of the massage device of FIG. 1A through the line 1E-1E.

The massage device 100 includes an internal cavity 140 as shown in FIGS. 1C and 1D. In FIGS. 1B and 1C, the cavity 140 is shown as a dashed line. The cavity 140 extends from the bottom surface 130 of the massage device 100 and is defined by an interior surface 150 of the massage device 100. FIG. 1E is a cross-section view of the massage device of FIG. 1A. The interior cavity 140 has a hemispherical shape. The exterior surfaces 111 and 121 of the massage device have a different curvature than the interior surface 150. In other words, a first width at a first location 105 is smaller than a second width at a second location 107. The width gradually transitions from the first width at the first location 105 to the second width at the second location 107.

The bottom surface 130 has a generally circular shape. In other implementations or configurations, the bottom surface 130 can have other shapes, such as oval, rectangular, star, irregular, or other geometric and non-geometric shapes. In this implementation, the entire massage device is formed from a single material. The massage device can be formed in a single mold. In one implementation, the massage device includes a material that forms a self-hardening shell that creates a smooth resilient surface for interaction with the user. The material may be polyurethane foam or an Ethylene-vinyl acetate. In an alternative implementation, the massage device includes an open-celled internal foam portion and a closed-cell external portion. The massage device is resilient such that it resists permanent deformation.

The surface 150 defines the size and shape of the cavity 140. The surface 150 can include one or more sections. For example, in the implementation shown in FIG. 1E, the surface 150 includes an upper section 151 and a lower section 152 that form a continuous arc in the cross section and form a spherical shape in three dimensions. In some implementations, the upper section 151 of the surface 150 can be parallel to the top surface 111 and the lower section 152 can be parallel to the lower outer surface 121. In other implementations, a portion of the surface 150 can be concentric with one or more of the top surface 111 and the lower outer surface 121. A width of the device between the interior surface and the exterior surfaces 111 and 121 can be consistent throughout the device in one implementation.

A first diameter 131 of the interior cavity 140 is smaller than a second diameter 133 of an outer edge 135 of the bottom surface 130. In one implementation, the first diameter is 4.5 inches and the second diameter is 6 inches.

In an alternative implementation, the top 110 can be a different material than the sidewall 120. For example, the top 110 can be a material that is configured to grip, hold, and move a user's skin to create friction with the user's muscle, while the sidewall 120 that corresponds to the bottom surface is a stickier material that grips a surface on which the device is used. The stickiness is associated with an ability to adhere or grip without leaving a residue. The grip of the top 110 is textured to create friction with the user's skin or clothing. If it is a smooth surface, it can be more difficult for the user to control movement over the top. The texture can have various dents or divots that are not visible to the naked eye.

In other implementations, the bottom surface can be a porous material that interacts with and grips a surface while the top is smooth or polished to allow for smooth movement across the top.

It is to be understood that the dimensions of the device and its shape can vary in order to provide an appealing appearance. Thus, radiuses of curvature, symmetry, and relationships of various cosmetic features to one another will have an artistic aspect unrelated to the function of the device.

FIGS. 2A-2E illustrate an alternative implementation of a massage device 200 formed in accordance with the present disclosure. The massage device 200 includes a body 205 (see FIG. 2E) having a top 210, a sidewall 220 depending from the top 210, and a bottom surface 230 associated with the sidewall 220. An angle measured between the sidewall 220 and the bottom surface 230 is greater than that between the sidewall 120 and the bottom surface 130 as shown in FIG. 1A, such that an overall height 201 of the massage device 200 is greater than a height 101 of the massage device 100. For example, the height 201 of the massage device 200 is 6 inches. A diameter 233 of an outer edge 235 of the bottom surface 230 is greater than the height 201. In one implementation, the diameter 233 is 7.5 inches.

The bottom surface 230 is circular and has an inner diameter of 231. The circular perimeter of an outer edge 235 and the circular perimeter of an inner edge 229 are concentric. In other implementations, one or both of the inner edge 229 and the outer edge 235 can have a different shape, such as an oval, a parallelogram, or other geometric or non-geometric shape. The inner edge 229 and the outer edge 235 can have different shapes with respect to one another.

Figure 2A:
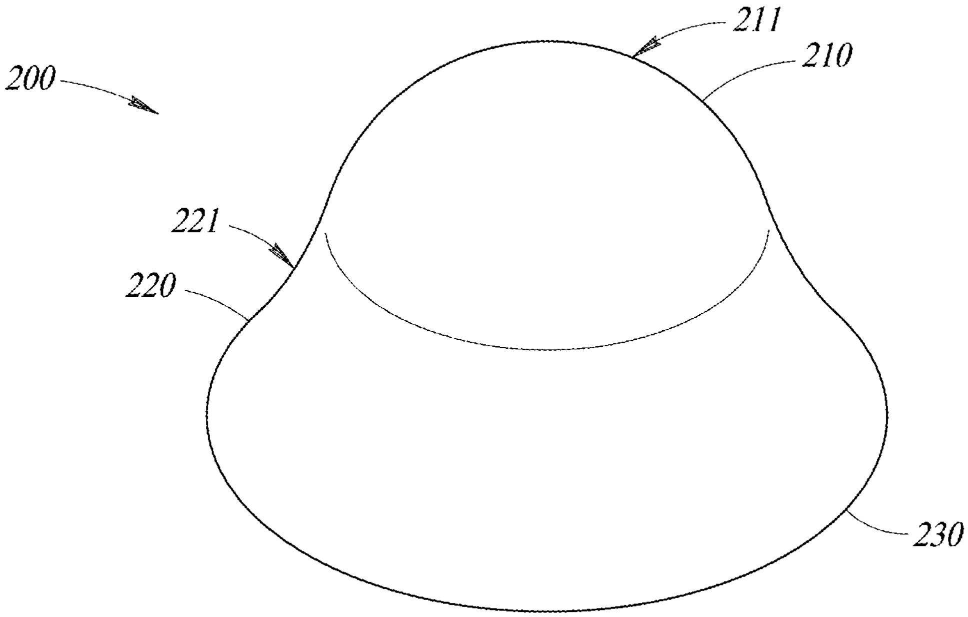
FIG. 2A is a pictorial view of a massage device according to another implementation of the present disclosure.
Figure 2B:
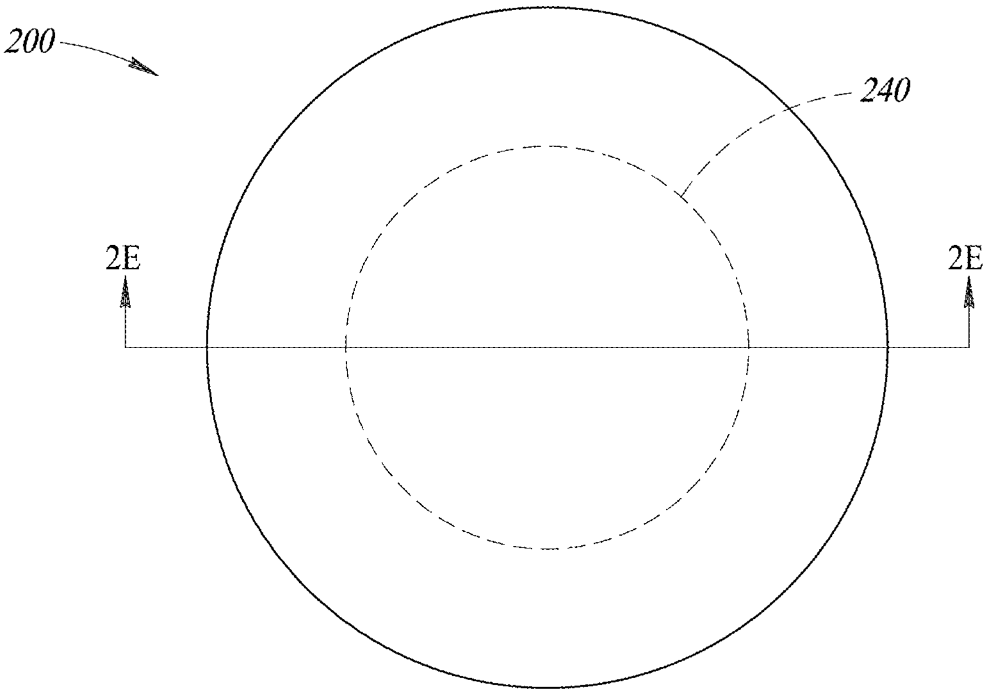
FIG. 2B is a top view of the massage device of FIG. 2A.
Figure 2C:
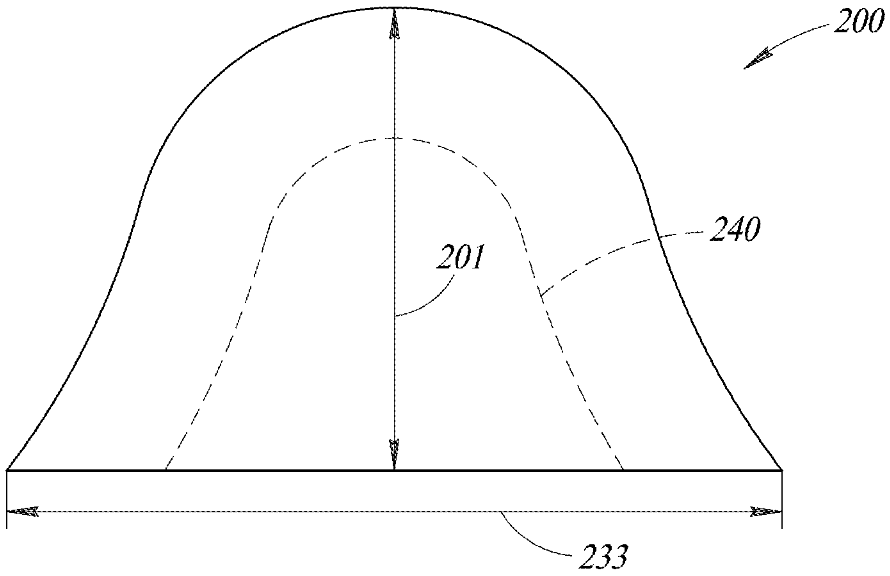
FIG. 2C is a side view of the massage device of FIG. 2A.
Figure 2D:
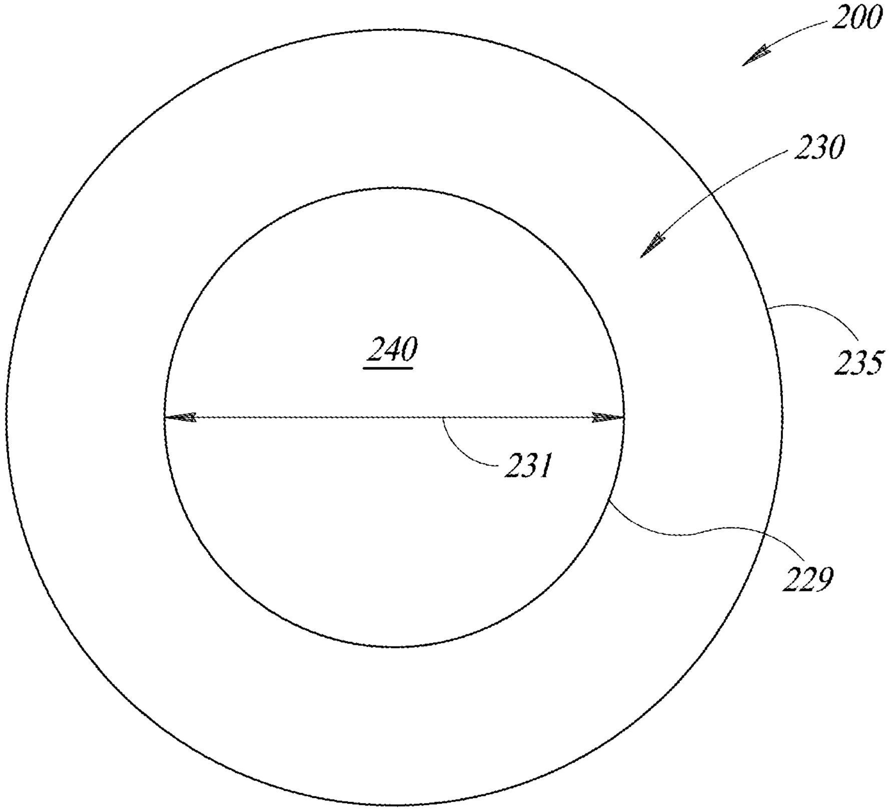
FIG. 2D is a bottom view of the massage device of FIG. 2A.

The inner edge 229 corresponds to an interior cavity 240, which can be seen in dashed lines in FIGS. 2B and 2C. In this implementation, the interior surface 250 of the cavity 240 corresponds to an exterior surface of the device. The surface 250 defines the size and shape of the cavity 240. The surface 250 can include one or more sections. For example, the surface 250 includes an upper section 251 and a lower section 252. The sections can be defined by the radius of curvature of the corresponding interior surface. The lower section 252 has a slightly outward curvature away from a center towards the outer edge. The upper section 251 corresponds to a portion of a circle, which will be described in more detail below with respect to radius R2.

The top 210 also corresponds to a portion of a circle, which has a larger radius R1 than the radius R2. This circular configuration facilitates massaging muscles and other body tissues. The round or curved surface offers a specific, focused surface area for penetrating deep tissue massage. The top 210 has a top surface 211 that has a spherical or dome shape that provides for muscle penetration when a body is pressed against the massage device 200. However, the specific radius of curvature can be varied to provide an aesthetically appealing appearance.

In one implementation, a first radius R1 of the top surface 211 can be small, for example, between one half and 2 inches. A small radius has a smaller skin contact area, facilitates deeper penetration into muscle and other soft tissue and also facilitates more precise massaging and stretching. In other implementations the first radius can be larger, for example, between 2 inches and 4 inches. A larger radius can have a larger skin contact area or surface area.

The larger surface area can be suitable for a larger user or provide for a different style massage, such as a shallower massage over a larger area.

The sidewall 220 can have a substantially concave lower surface 221, i.e., the sidewall flares out from the top 210. The sidewall 220 can have a first or upper end that transitions to the top 210 and a second or lower end that transitions to the bottom surface 230.

As with the bottom surface 130 of massage device 100, the bottom surface 230 in this implementation is substantially flat and can act as a base to support the massage device 200. The bottom surface 230 in conjunction with the sidewall 220 support the device when a force of a user is applied from the top down on the massage device 200. In one implementation, the sidewalls are substantially rigid such that they can slightly compress to absorb the weight or pressure of the user while maintaining nearly the original shape of the device. The volume of the interior cavity can be slightly reduced during use, such as a reduction in volume of 10% or less. In other implementations, there is no change to the interior volume.

Figure 2E:
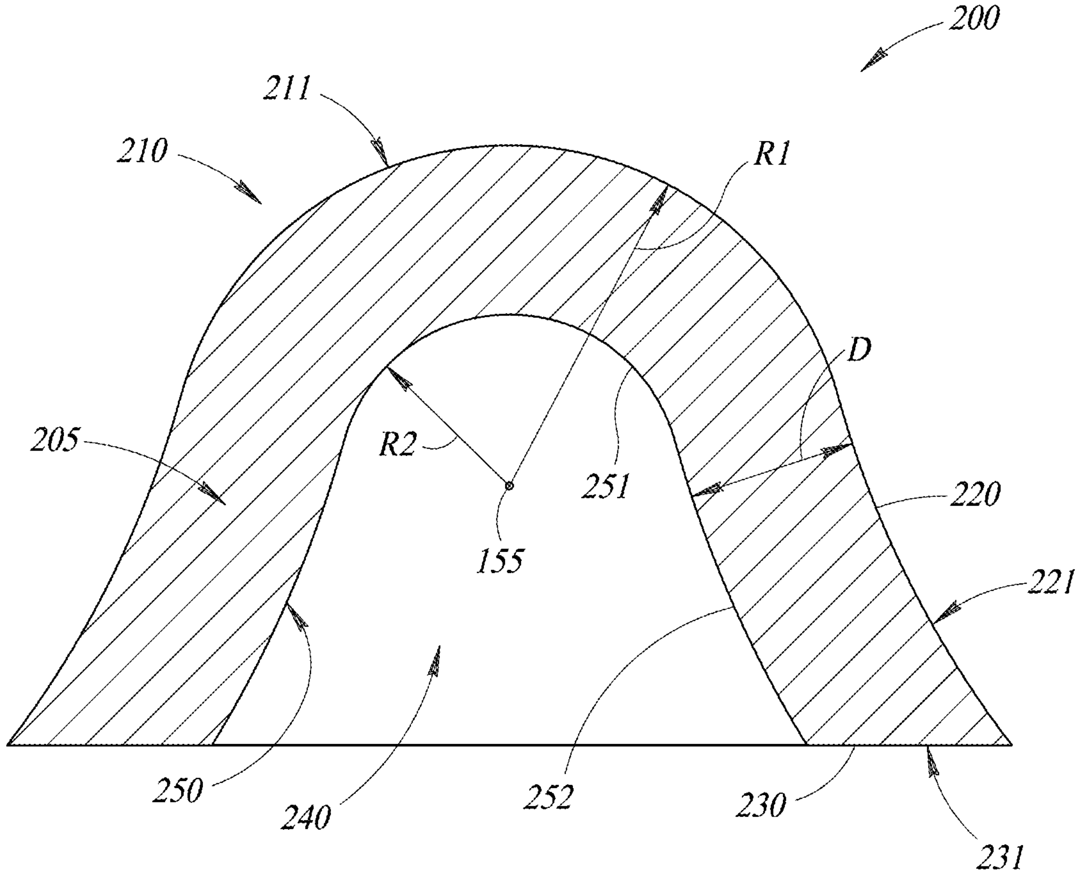
FIG. 2E is a cross section of the massage device of FIG. 2A through the line 2E-2E.

As shown in FIG. 2E, the body 205 of the massage device 200 can have a substantially constant thickness D. As shown in FIGS. 2C and 2E, the inner surface 250 of the cavity 240 can be parallel to the top surface 211 and lower surface 221. The upper section 251 of the inner surface 250 can be concentric with the top surface 211, and can share the same center 155. The radius R2 of the upper section 251 can be equal to the radius R1 less the thickness D.

As shown in FIG. 2E, the lower section 252 of the inner surface 250 can have a shape that corresponds to the shape of the outer lower surface 221. In the implementation shown in FIG. 2E, the lower section 252 has a convex surface shape that corresponds to the concave shape of the lower surface 221.

In some implementations, the inner surface 250 of the cavity 240 can have other shapes. For example, the inner surface can have a pyramidal shape, a cube shape, or other shape. Likewise, the top 210 can have a shape other than that of a spherical cap or spherical dome. For example, the top 210 can have a pyramidal shape, preferably one with shallow or substantially horizontal faces, can have a flat shape, have multiple tops 210, or other shape that facilitates muscle massaging.

FIGS. 3A-3E illustrate an implementation of a massage device having a body 305 with integrated attachment structures 370 formed in accordance with the present disclosure. The massage device 300 has a curved top exterior surface 311 that is coupled to a flat bottom surface shown at 330 and 331. The device can be a single unitary piece of material that includes integrated attachment structures 370. A removable cover, such as the covers described below with respect to FIGS. 5A and 6A can releasably couple to the attachment structures 370, as described further below. In this implementation, there are four attachment structures 370. Other numbers of attachment structures 370 can be included.

Each attachment structure 370 includes a channel 373 and a protrusion 372. The protrusion 372 is flush with an exterior surface 311 of the device, such that the protrusion 372 does not extend outside of the dome shape of the device. The channel 373 is removed from the bottom surface 330. This can be removed after the device is formed or the device can be formed in a mold that defines the protrusions and other features of the device.

Figure 3A:
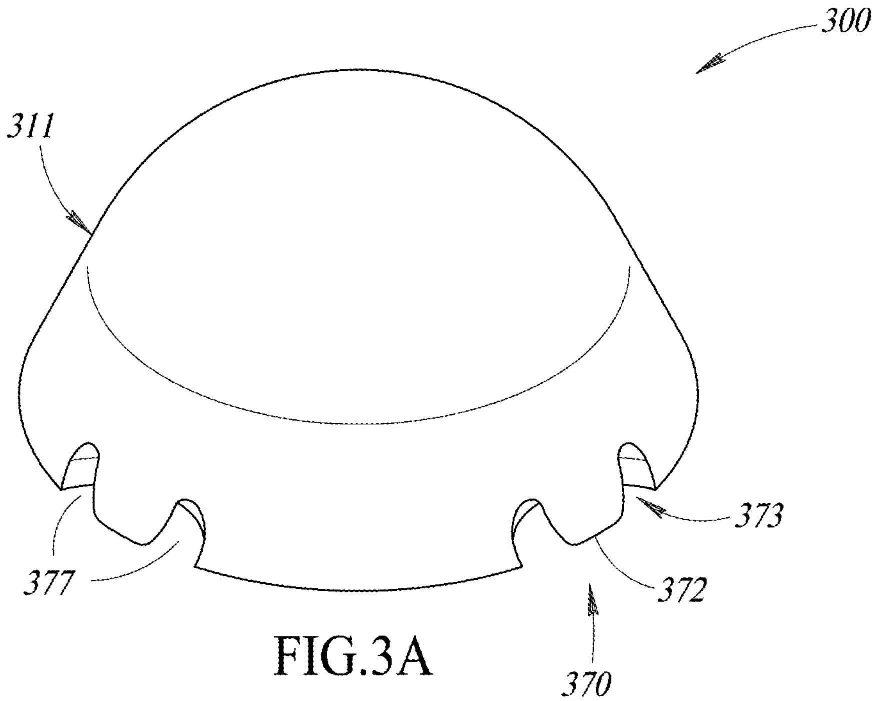
FIG. 3A is a pictorial view of a massage device according to another implementation of the present disclosure.
Figure 3B:
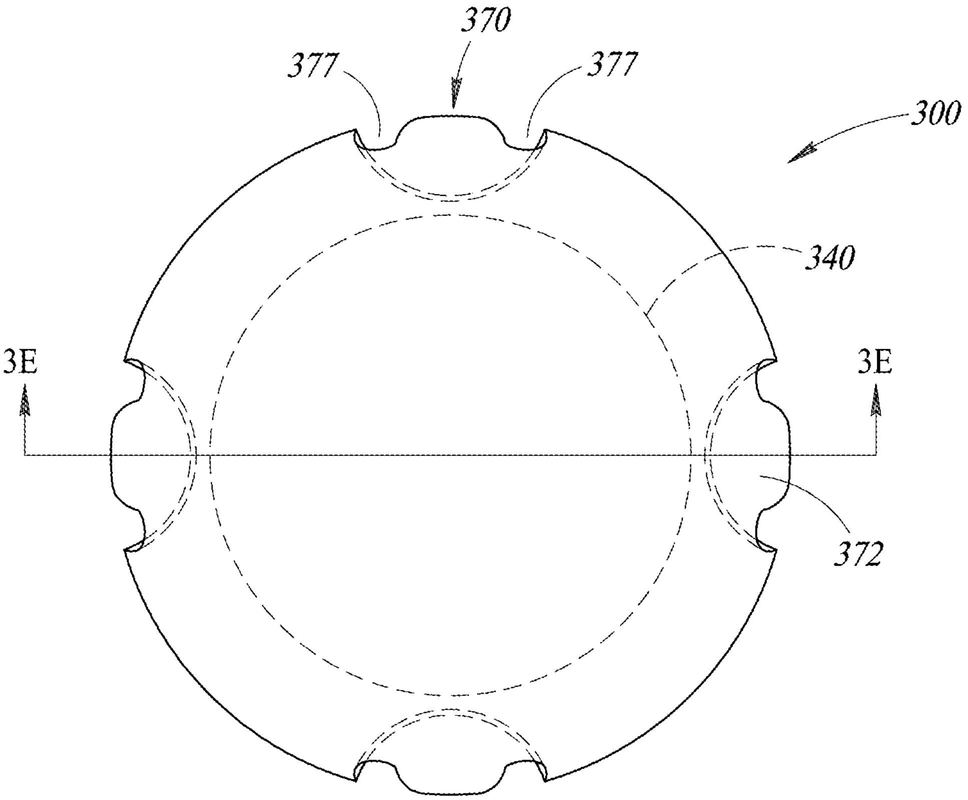
FIG. 3B is a top view of the massage device of FIG. 3A.
Figure 3C:
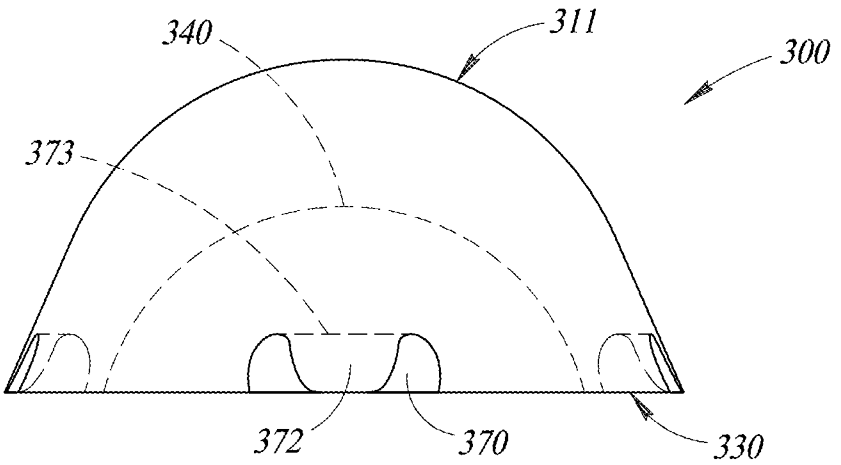
FIG. 3C is a side view of the massage device of FIG. 3A.
Figure 3D:
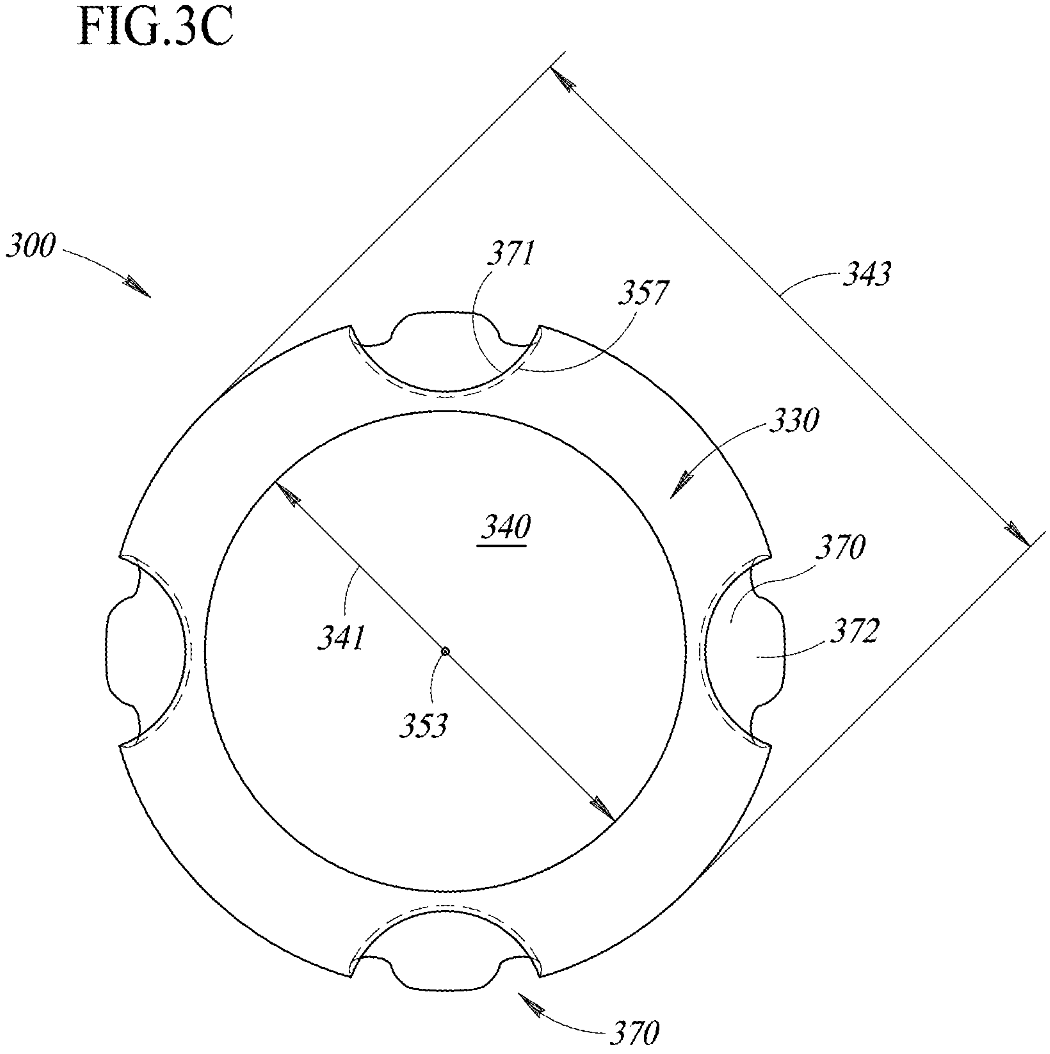
FIG. 3D is a bottom view of the massage device of FIG. 3A.
Figure 3E:
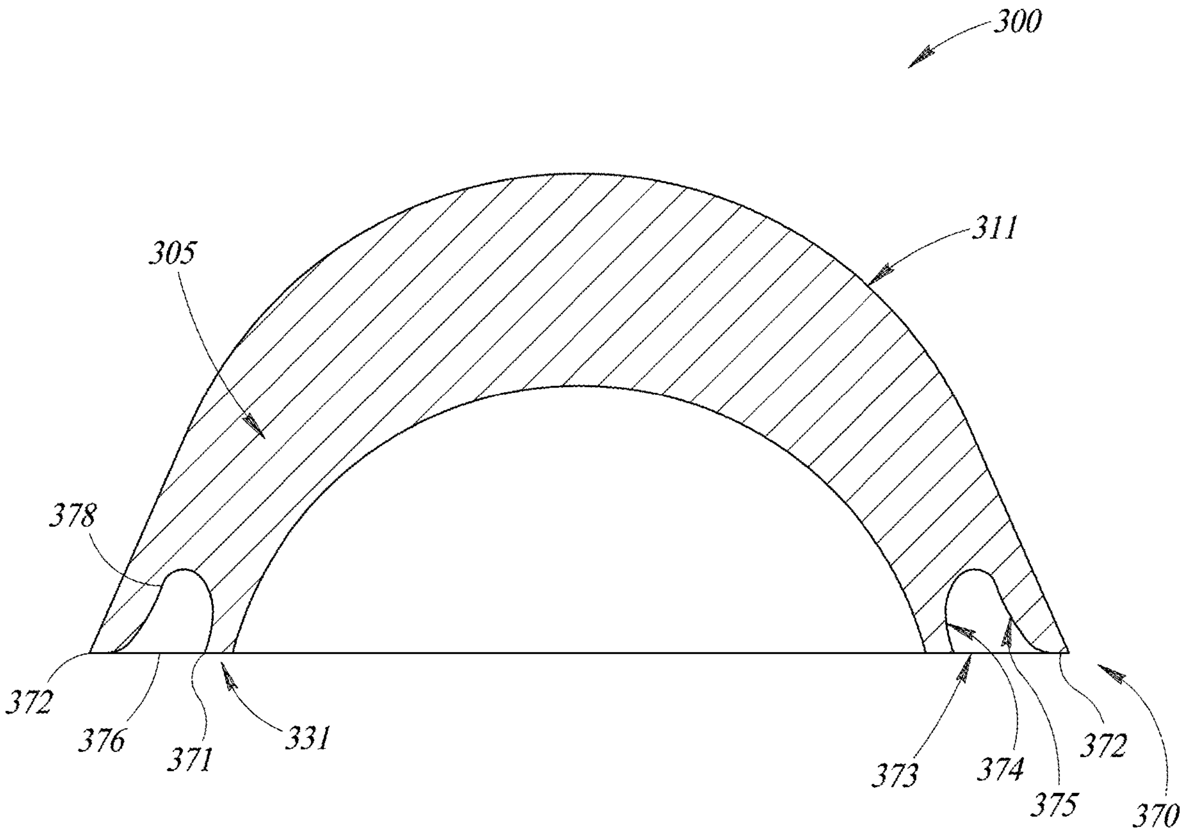
FIG. 3E is a cross section of the massage device of FIG. 3A through the line 3E-3E.

As viewed in FIG. 3E, the channel 373 is an opening 376 into the bottom surface 330 of the massage device 300. The channel 373 includes laterally opposed inner sidewall 374 and outer sidewall 375. The inner sidewall 374 can define an inner boundary of the channel 373. The outer sidewall 375 can define an outer boundary of the channel 373. The outer sidewall 375 also defines an inner surface of the protrusion 372.

The channel 373 can also define the size and shape of the protrusion 372. For example, in FIGS. 3A-3E, the channel 373 includes two outlets 377 that open up onto the exterior surface 311 of the massage device 300. Dimensions (e.g., length, width) of the protrusion 372 are defined by a distance between the two outlets 377 and by a width of the channel 373. In addition, the shape of the outer sidewall 375 of the channel 373 can define the shape of the inner surface of the protrusion 372. For example, as shown in FIG. 3E, the outer sidewall 375 of the channel 373 can have a convex surface shape. The convex surface shape can help form a pocket or detent 378 in the protrusion 372. In some implementations, the pocket or detent 378 in the protrusion 372 can be located at or near the base of the protrusion 372. In some implementations, the pocket or detent 378 is located elsewhere on the protrusion 372 or the protrusion is formed without a pocket or detent 378.

Although the channel 373 is depicted as being substantially half bean shaped, it can be U-shaped or in other implementations, the channel can have other shapes, for example, the channel can be V-shaped.

In this implementation, the massage device is wider than it is tall. This gives a wide surface area on which a user can apply pressure for massage. The protrusions 372 end or abut a plane that is the same plane in which the bottom surface 330 extends; see FIG. 3C. Also in FIG. 3C, dashed lines identify from a side view the channel 373 and an interior cavity 340. FIG. 3D is a bottom view of the device 300 where the bottom surface 330 is visible. The interior cavity 340 has a first dimension 341 and the exterior surface 311 has a second dimension 343. The first and second dimensions define generally concentric circles in this implementation; however, in other implementations, the first and second dimensions do not define generally concentric circles, are not consistent throughout their respective area, and do not correspond to each other.

From the bottom surface 330 a semicircular curvature 371 that provides one boundary of the channel 373 is visible. The channel 373 curves further towards a center point 353. A dashed line 357 shows the further interior curvature of the channel 373.

Figure 4A:
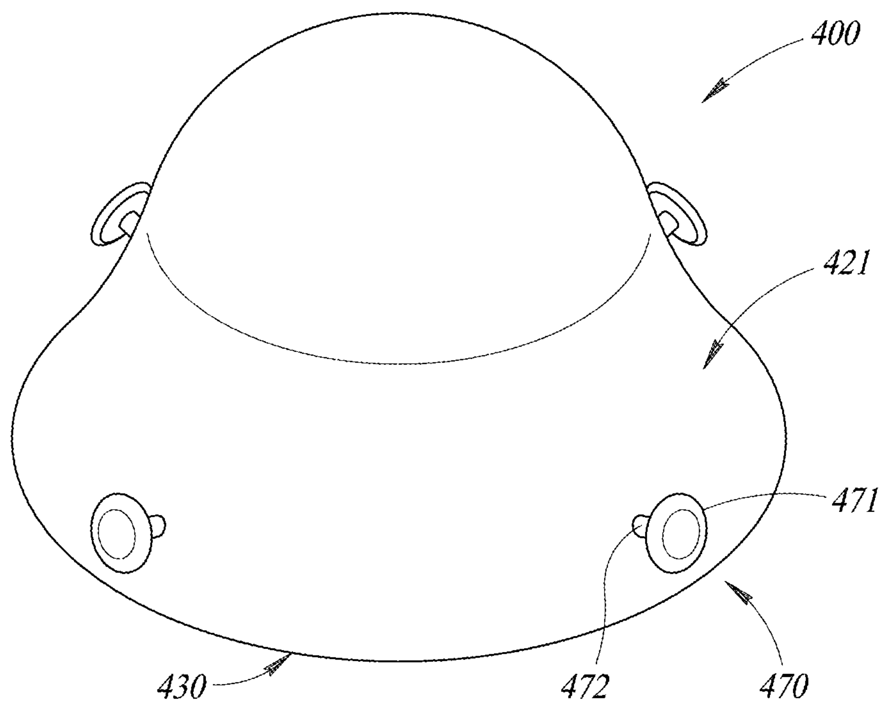
FIG. 4A is a pictorial view of a massage device according to another implementation of the present disclosure.
Figure 4B:
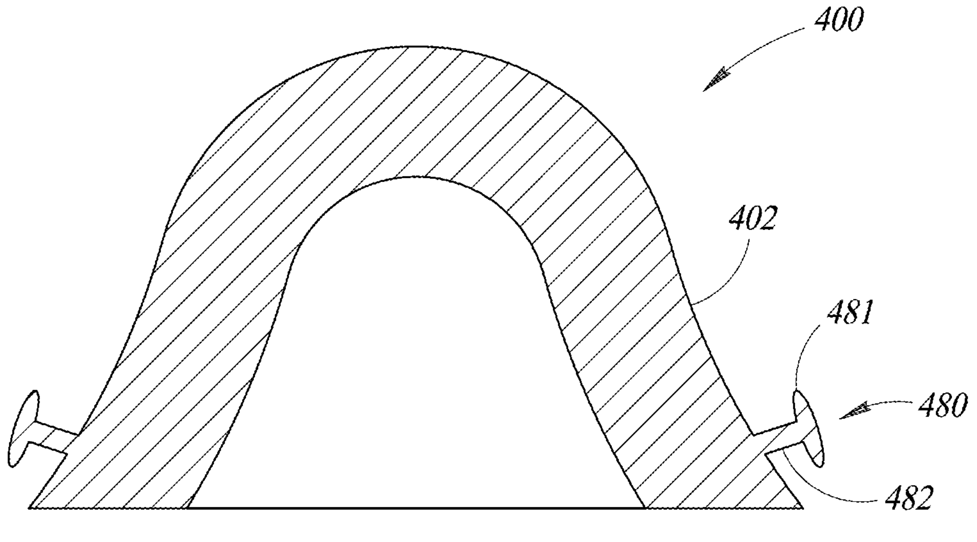
FIG. 4B is a cross section of another implementation of the present disclosure.

FIGS. 4A-4B are alternative implementations of a massage device 400 that includes protrusions 470. The protrusions 470 are configured to couple or attach one of the removable covers described in further detail below to the massage device 400. The shape of this massage device 400 is more similar to the massage device shown in FIGS. 2A-2E. In FIG. 4A, there are four protrusions 470 that extend from a lower portion 421 of the device, which is closer to a bottom surface 430.

The protrusion 470 includes a head 471 attached to a post 472. The head 471 is wider than a diameter of the post 472. A ratio of a width of the head 471 to a diameter of the post 472 can be greater than 4 to 1. The head 471 and post 472 can be made of one or more of many suitable materials including metal, plastic, other polymers, and wood. The protrusion 470 can be coupled to the massage device 400 after the device is manufactured. For example, in some implementations, the post 472 is punctured or otherwise held by the lower portion 421 of the device.

In an alternative implementation, the massage device 400 can include integrated protrusions 480 formed of the same material as the device; see FIG. 4B. The protrusion 480 is a unitary structure with the body 402 of the massage device 400, that is, the protrusion and is integral or integrally formed with the body 402. As shown in FIG. 4B, the body 402, a post 482, and a head 481 can all be made from the same material and formed as one piece.

Figure 5A:
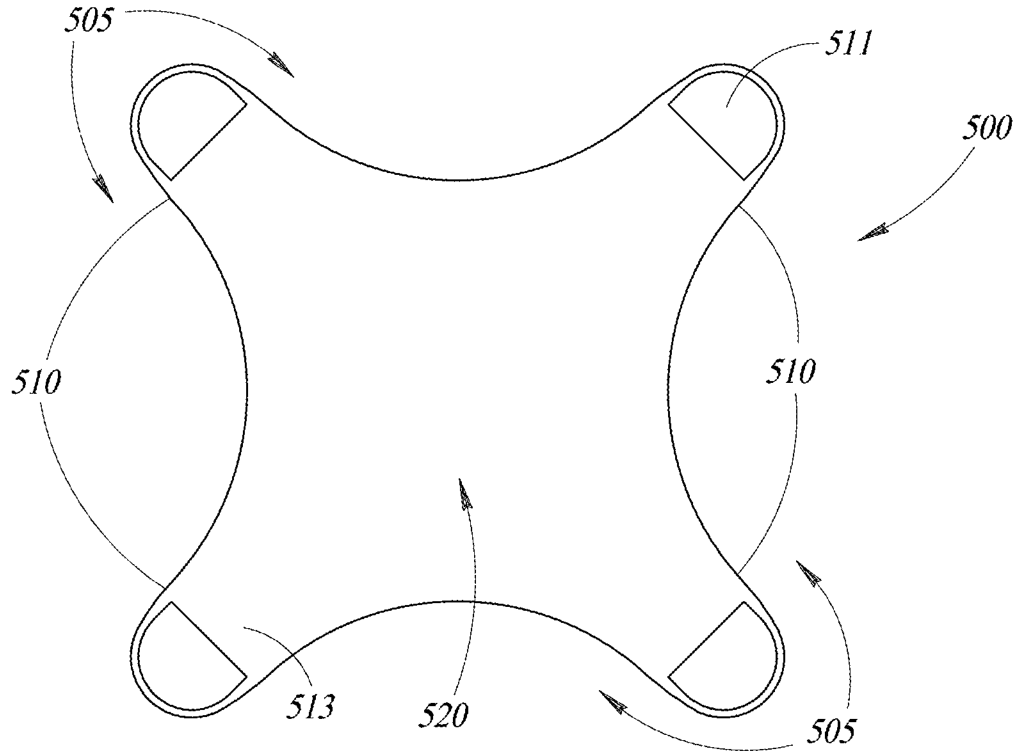
FIG. 5A is a top view of a removable cover according to an implementation of the present disclosure.
Figure 5B:
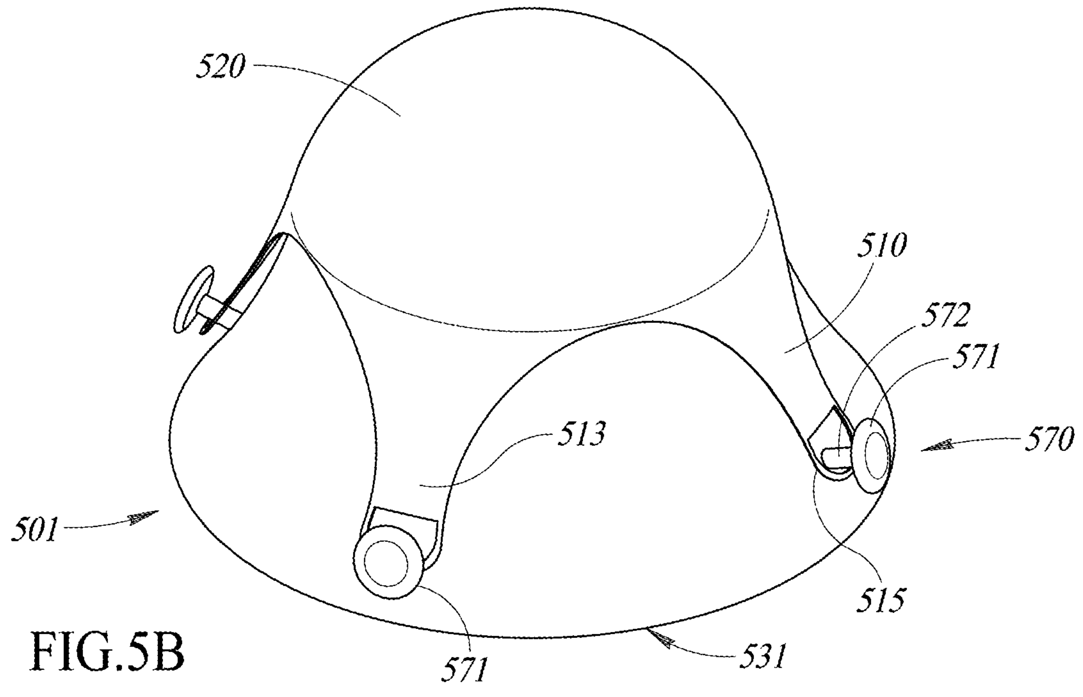
FIG. 5B is a pictorial view of the cover of FIG. 5A on a massage device.
Figure 5C:
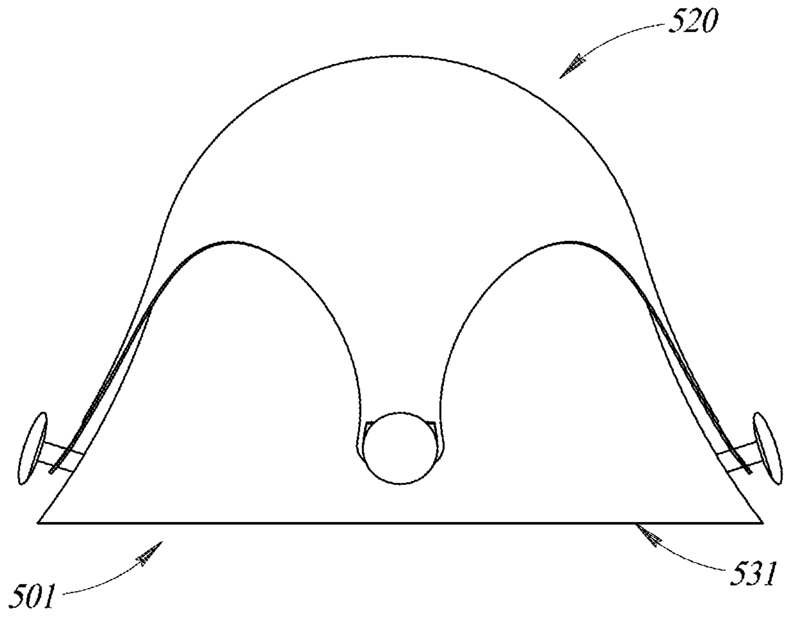
FIG. 5C is a side view of the cover on the massage device.

FIG. 5A is an unattached cover 500 that is configured to attach to a massage device, such as the massage devices previously described. As shown in FIGS. 5B and 5C, the cover 500 is positioned on a top of a massage device 501. The cover 500 provides additional or modular functionality to the massage device 501. For example, in some implementations, the cover 500 can have a different texture than an uncovered massage device 501. In some implementations, for example when massaging through clothes or when massaging with lots of movement, a user can want a relatively friction-free surface so that the massage device does not snag or hang up on clothes or skin. A user can also wish to massage with a higher friction surface. For example, in situations where substantial movement is not beneficial or when massaging directly on skin, the user can want a tacky or higher friction surface so that the massage device 501 will stay in a small area. Alternatively, the cover can be coupled to cover the bottom surface of the massage device so a user can change the friction and other properties of the bottom surface 531.

The removable cover 500 includes a central portion 520 that can be a single piece of material. The central portion 520 can be made from the elastic or other stretchable materials or fabrics. Stretchable materials allow the cover 500 to have a substantially flat shape when not attached to a massage device 501 and also allow the cover 500 to stretch and conform to the shape of the massage device 501. For example, as shown in FIGS. 5B-5C the cover 500 conforms to the shape of the top of the massage device 501 when attached.

The cover 500 includes openings 511 bounded by curved extensions 510 that extend from the central portion 520 of the cover 500. The central portion 520 and the curved extensions 510 can be made from the same material or different materials. For example, the central portion 520 can be configured to have particular friction properties, which can be based on a selected use. The curved extensions 510 can be configured to have particular strength or elasticity properties, which can be based on how secure or how taut the cover 500 attaches to the massage device 501.

The cover 500 can also include curved sides 505 between the curved extensions 510. The curved sides 505 can reduce the quantity of material used to make the cover 500 as compared to a cover without curved sides. The size and shape of the curved sides 505 can also change to suit the properties of the cover 500 and the curved extensions 510. For example, removing a larger amount of material can provide for narrower arms 513 with greater stretch ability as compared to removing smaller portions, which would create wider arms 513.

The openings 511 can facilitate attaching the cover 500 to the massage device 501. For example, massage device 501 can include protrusions 570 that can be similar to protrusions 470 shown in FIGS. 4A-B. The apertures 515 can slide over a head 571 of a protrusion 570 and hook on to the post 572.

In some implementations, the cover 500 can include other means for attaching to the massage device 501. For example, in some implementations, couplers can be added to the cover 500, such as snaps or hook-and-loop fasteners that couple with a corresponding snap or hook-and-loop fastener on the massage device 501.

Figure 6A:
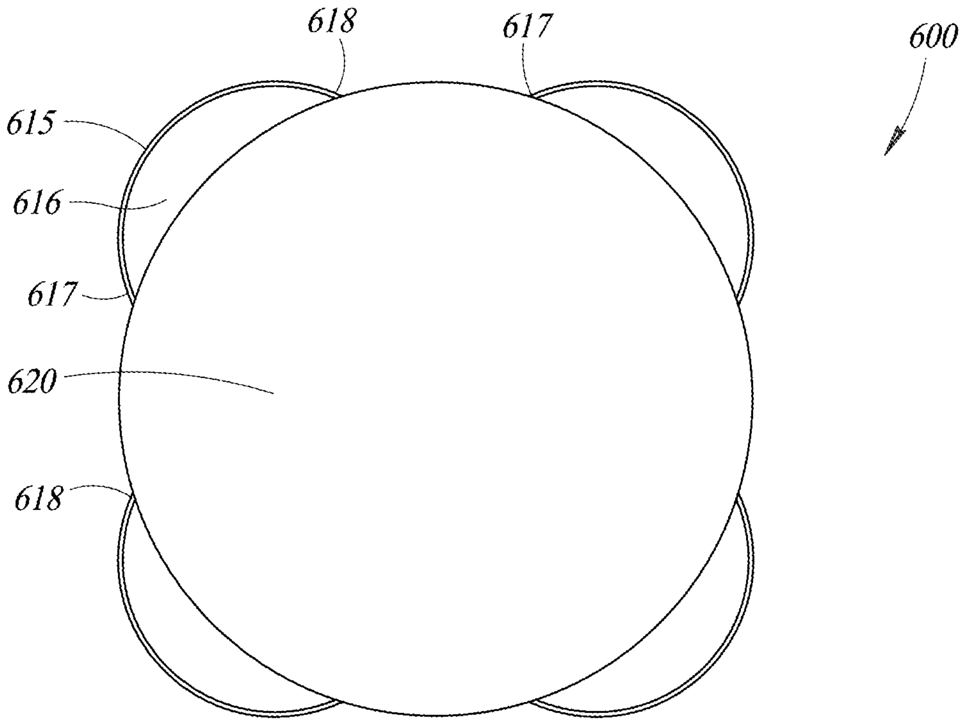
FIG. 6A is a top view of a removable cover according an implementation of the present disclosure.
Figure 6B:
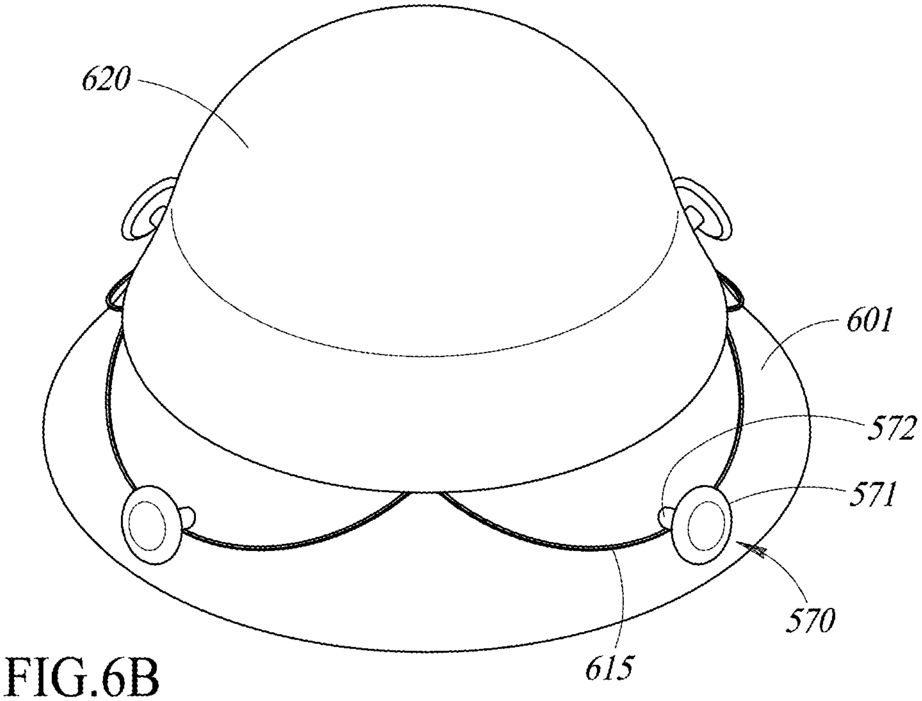
FIG. 6B is a pictorial view of the cover of FIG. 6A on a massage device.
Figure 6C:
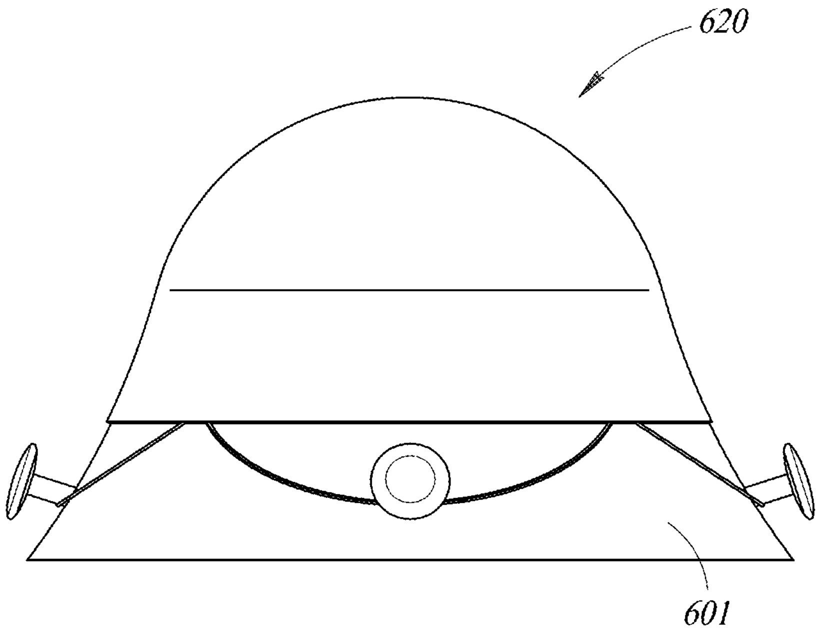
FIG. 6C is a side view of the cover on the massage device.

FIGS. 6A-6C illustrate an alternative implementation of a removable stretchable cover 600 formed in accordance with the present disclosure. The cover 600 is configured to attach to the top or bottom of a massage device 601. The massage device is formed to have interior protrusions on a bottom surface or exteriorly positioned protrusions 570. For example, as shown in FIGS. 6B and 6C, the cover 600 is attached to a top of the massage device 601. As with the cover 500 discussed above, the cover 600 provides additional or modular functionality to the massage device 601.

The cover 600 includes a central portion 620 that has a circular shape. The central portion 620 ideally is constructed of elastic or other stretchable materials or fabrics that can stretch in length and width to conform to the size and shape of the massage device. Stretchable materials allow the cover 600 to have a substantially flat shape when not attached to a massage device 601 and also allow the cover 600 to stretch and conform to the shape of the massage device 601. For example, as shown in FIGS. 6B-C the cover 600 conforms to the shape of the top of the massage device 601.

While in some implementations, the cover 600 can have a flat shape when in a relaxed position, as shown in FIG. 6A, in other implementations the cover 600 has a more three-dimensional shape when in a relaxed position. For example, in some implementations, the cover 600 is sized and shaped to correspond to the shape of a massage device 601. In some implementations, the cover 600 includes a spherical or dome shape.

The cover 600 can include attachment loops 615 that extend from the central portion 620 of the cover 600. Each loop 615 forms an aperture 616 in combination with the central portion 620 of the cover 600. As shown in FIGS. 6B and 6C, the loops 615 are configured to engage with a protrusion 570 of the massage device 601. Although FIGS. 6B and 6C depict the protrusions 570 as similar to that of the protrusions 470 shown in FIG. 4A, in some implementations the attachment device can be similar to the hook and channel shown in FIGS. 3A-3E or another type of attachment device, as discussed herein.

The attachment loops 615 have a first end 617 and a second end 618 attached to the central portion 620 of the cover 600 to form the loop 615. The attachment loops 615 can be made from one or more of a number of materials. For example, the loops can be made from elastic or stretchable material, such as rubber, or from stiffer material, such as nylon.

Although FIG. 6A shows the ends 617, 618 of a first loop 615 attaching to the central portion near or at the same location as the ends 617, 618 of other loops 615, in some implementations, the ends 617, 618 of the loops 615 do not attach to the central portion near or at the same location as the ends 617, 618 of other loops 615. In some implementations, the ends 617, 618 of the loop 615 attach to the central portion at the same location or next to each other.

In some implementations, the loop 615 is continuous or otherwise does not have ends 617, 618. In such implementations, a portion of the loop 615 is attached to the central portion 620.

The removable covers can have a variety of textures that range from a smooth spandex type material to a textured material that has significant high and low points. The textured material can utilize a plurality of resilient dots that are affixed to or formed as part of the central region. Preferably, the resilient dots are sized and shaped to be touching adjacent resilient dots. The dots can have varying diameters as a base and varying heights to provide differing massage surfaces when applied to the massage device. The massage device can be packaged together with a plurality of removable covers that offer a variety of textures that can be rotated as selected by the user.

FIGS. 7A-7E illustrate an alternative implementation of a massage device 700 that includes a body 705 that has curved sides 790 that curve outwardly away from a center point of the top 710. The massage device 700 includes grooves 795 that alternate with extensions 792 on the sides 790. The grooves 795 are formed in the body 705 and project inward with respect to a lower surface 721 and an upper surface 720 of the extensions 792.

Figure 7A:
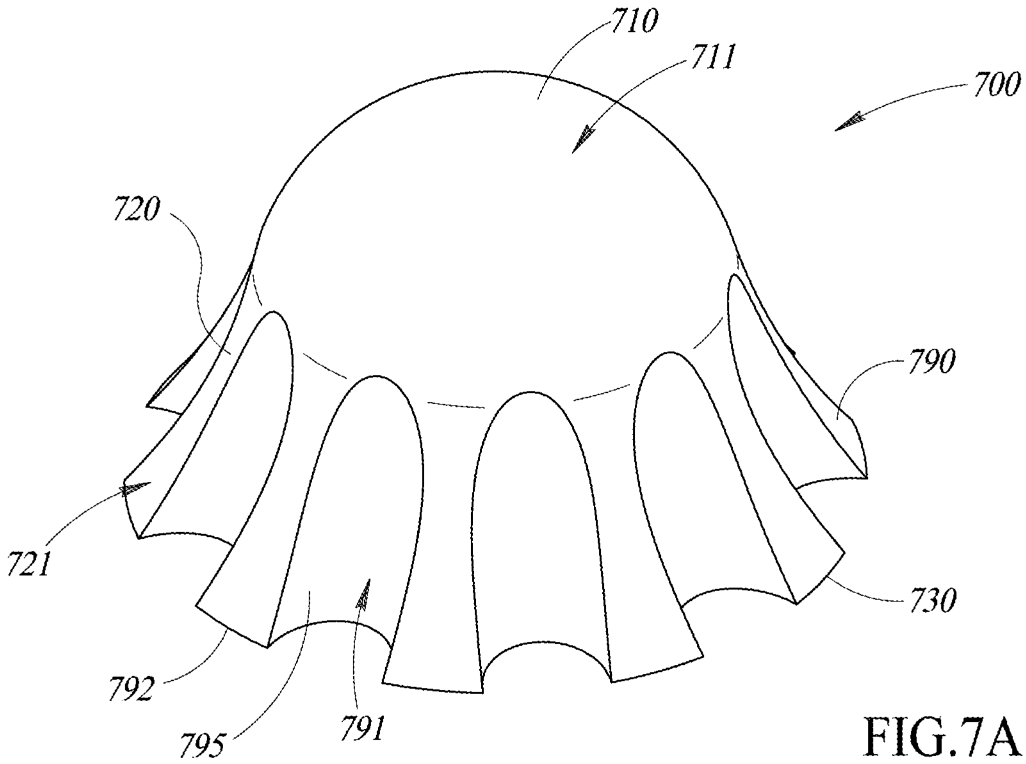
FIG. 7A is a pictorial view of a massage device according to an implementation of the present disclosure.
Figure 7B:
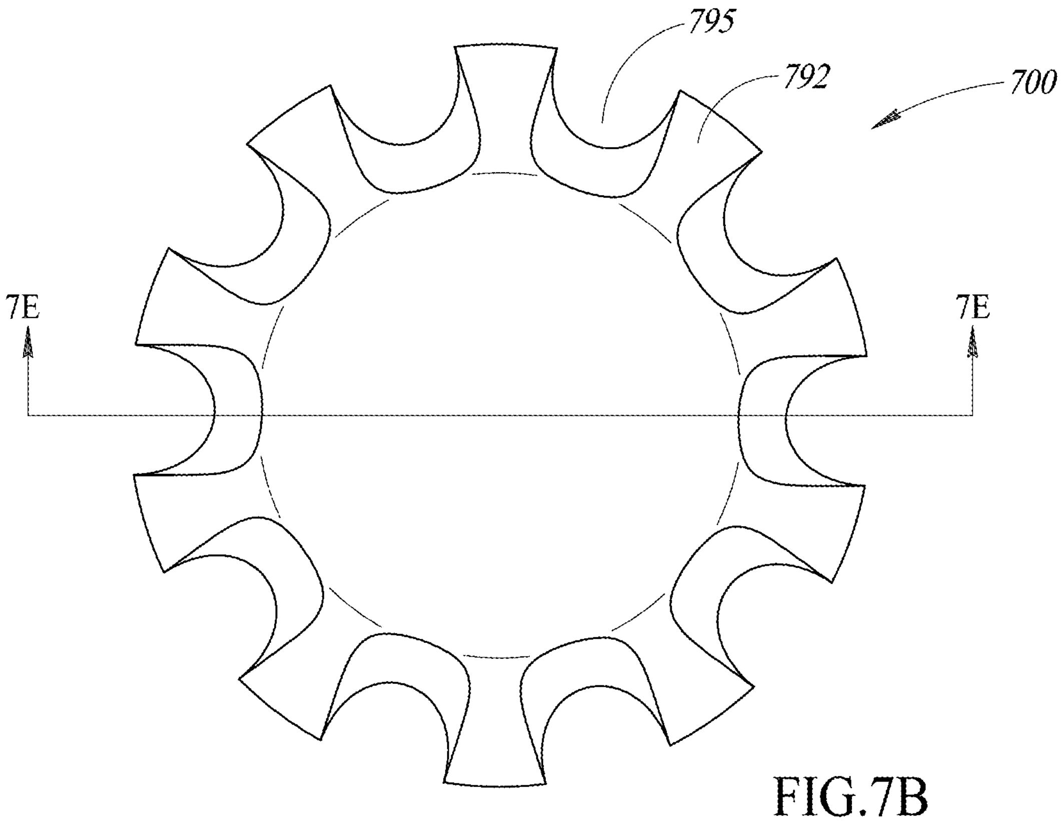
FIG. 7B is a top view of the massage device of FIG. 7A.
Figure 7C:
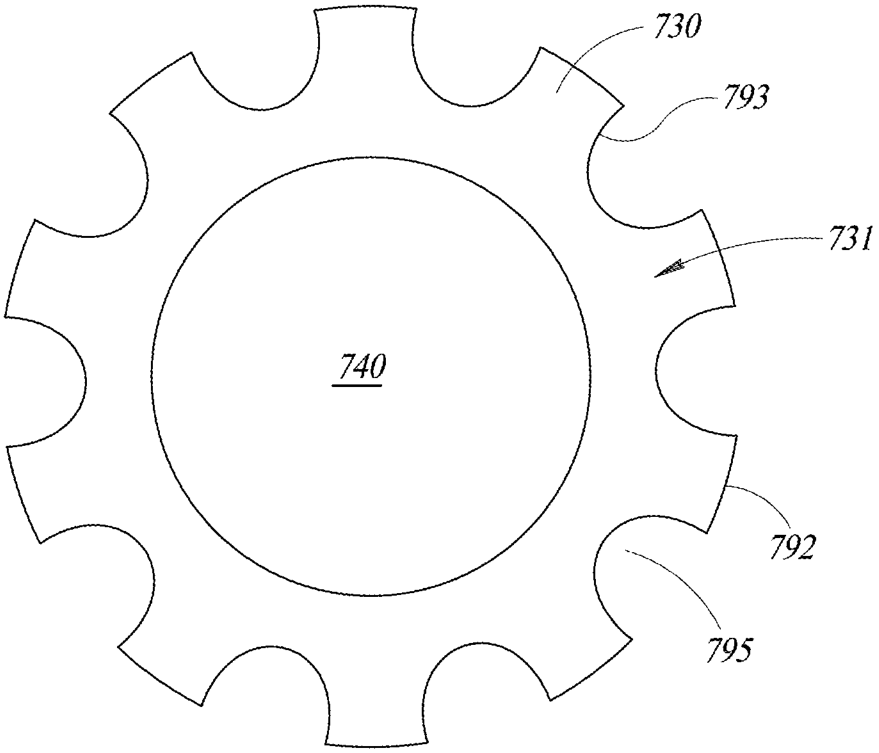
FIG. 7C is a bottom view of the massage device of FIG. 7A.
Figure 7D:
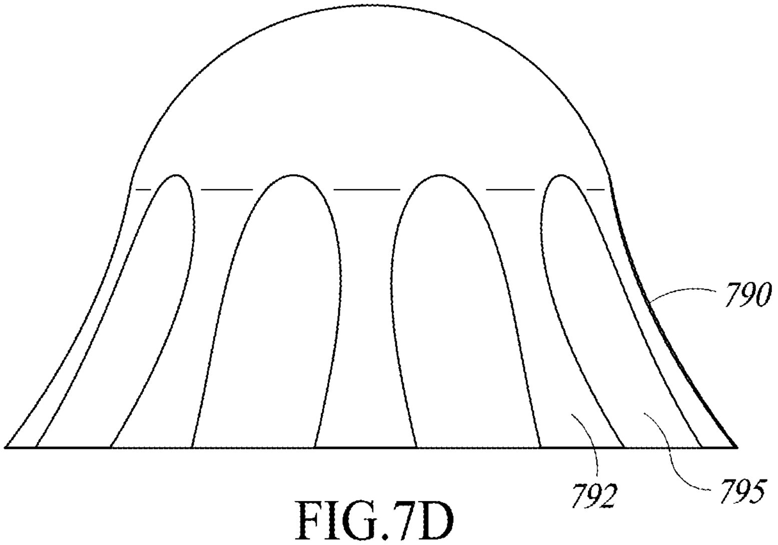
FIG. 7D is a side view of the massage device of FIG. 7A.
Figure 7E:
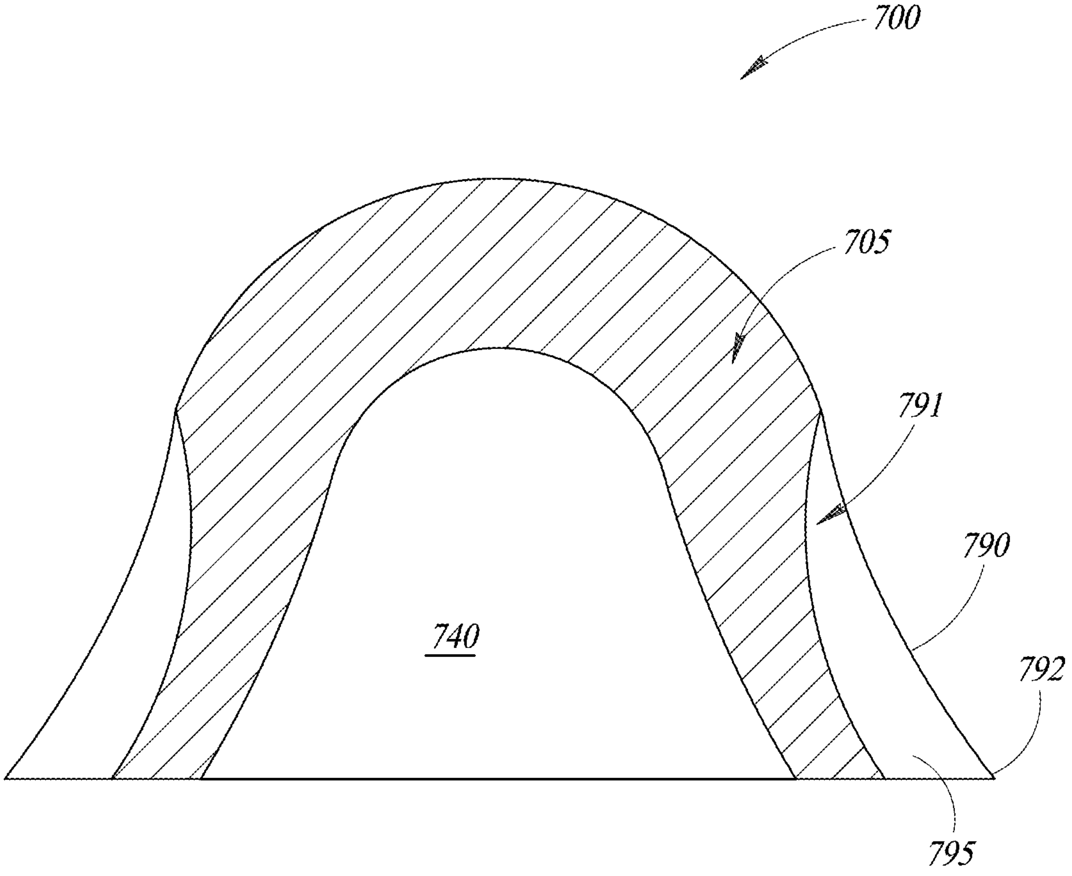
FIG. 7E is a cross section of the massage device of FIG. 7A through the line 7E-7E.

The grooves 795 include an interior surface 791 that in one implementation can have an arc shape as viewed from the top or bottom, for example, as shown in FIGS. 7B and 7C. In some implementations, the curved side interior surface 791 has a V-shape or a three-sided square shape. As shown in FIG. 7E, the groove 795 has a concave shaped interior surface 791. In other implementations, the surface 791 is flat or will incorporate flat portions.

FIG. 7A is a pictorial view of the massage device 700. The extensions 792 are configured to receive an attachment portion from one of the removable covers. The number and shape of the extensions 792 are variable and can be selected for aesthetic value. FIG. 7B is a top down view of the device 700. FIG. 7C is a bottom view of a bottom surface 731 of the massage device 700. An interior cavity 740 is semi-circular in this implementation. In other implementations, the interior cavity can have a variety of shapes and relationships to the extensions and grooves. FIG. 7D is a side view of the massage device 700. FIG. 7E is a cross-section view through the line 7E-7E and shows the grooves 795, the extensions 792, and the interior cavity 740.

As discussed above, various features of the bottom 730 of the massage device 700 can provide additional self-gripping structures that can resist lateral movement of the massage device 700 when it is placed on a supporting surface. For example, when placing the massage device 100 on carpet, the bottom surface 730 will push down into the carpet. When pushed down into carpet, the carpet material immediately below the bottom surface 730 is crushed or deformed while the carpet material adjacent to the bottom surface 731 is not crushed or deformed, or it can be crushed or deformed to a lesser extent than the carpet near the bottom surface 731.

The curved sides of the extensions 792 of the massage device 700 provide additional resistance to lateral movement. For example, on carpet the lower edge 793 of each curved side 790 can partially encircle or partially enclose a portion of carpet; thus, in order to move the device laterally, additional carpet within each of the curved sides 790 can be crushed or deformed.

The massage device 700 includes one or more extensions 792 that protrude out from the sides of the massage device 700 to provide a wider base or bottom surface 730 and can provide additional support to resist tipping of the massage device 700. Although shown in FIGS. 7A-E as extending between curved sides 790, in some implementations, the extensions 792 extend only from the lower surface 721. The extensions 792 are preferably formed as a unitary structure with the rest of the massage device 700; however, in some implementations, the extensions are attached or coupled to the surfaces 711, 720, 721 of the massage device 700.

Figure 8A:
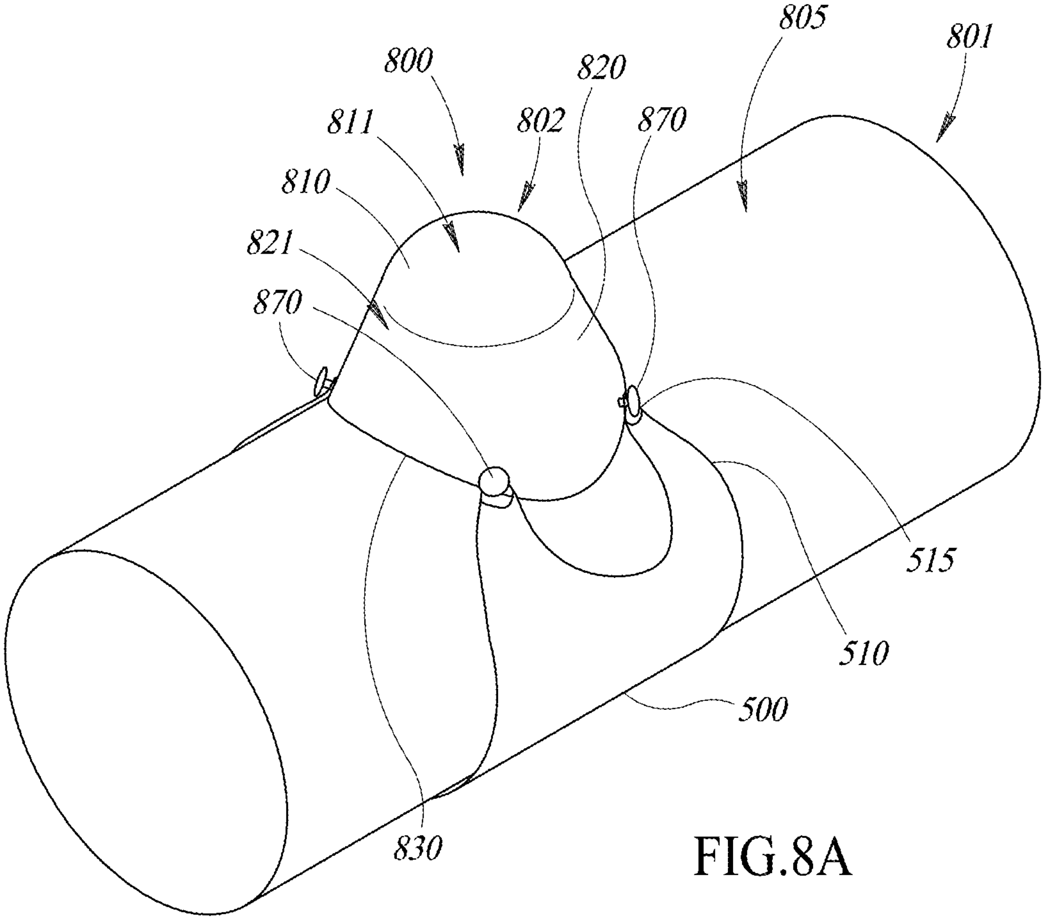
FIG. 8A is a pictorial view of a massage device coupled to a foam roller according to an implementation of the present disclosure.
Figure 8B:
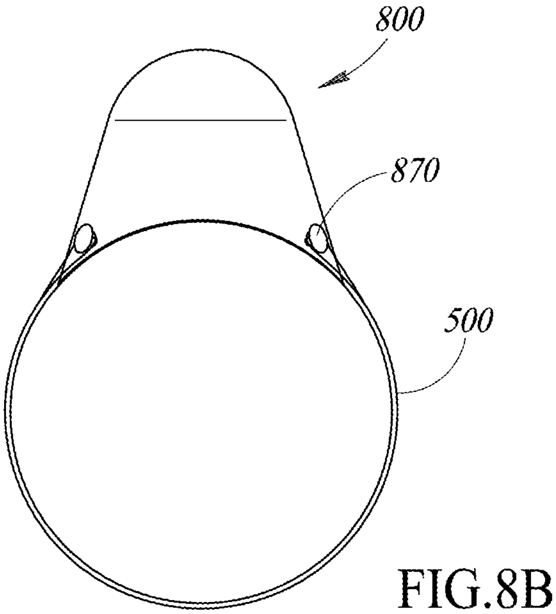
FIG. 8B is a side view of the massage device and the foam roller of FIG. 8A.

FIGS. 8A-8B illustrate an alternative implementation of a foam roller 801 with an attached massage device 800. A cover 500 attaches or couples the massage device 802 to the roller 801. The cover 500 attaches to the massage device 802 via apertures 515 and protrusion 870. The arms 513 and central portion 520 of the cover wrap around the outer surface 805 of the roller 801. In some implementations, different covers can attach the massage device 802 to the roller 801. For example, a cover 600 attaches the massage device 802 to the roller 801, while in some implementations a strap attaches the massage device to a roller as shown in FIGS. 9A-B.

The massage device 802 includes a top 810 having a top surface 811 and a sidewall 820 having an outer surface 821. The top 810 and sidewall 820 are ideally made from materials with differing properties. For example the top 810 can be made from a stiff material such as polyethylene foam, while the sidewalls 820 can be made from a more malleable material such as silicone. Using a stiff material for the top 810 provides a user with a stiff surface to use in massaging their muscles and other soft tissue while the more malleable material, such as silicone, allows the bottom 830 of the massage device 800 to more easily conform to the shape of the surface 805 of the roller 801. In such an implementation, the massage device 802 forms a dome shape when at rest and at least partially deforms, as shown in FIGS. 8A-B, when attached to a roller 801. In some implementations, the sidewalls 820 of the massage device 802 are made from a stiff material such that the bottom 830 of the massage device 802 conforms to the surface 805 of a roller 801, even in a rest or undeformed state. The massage device temporarily deforms when pressure is applied.

Figure 9A:
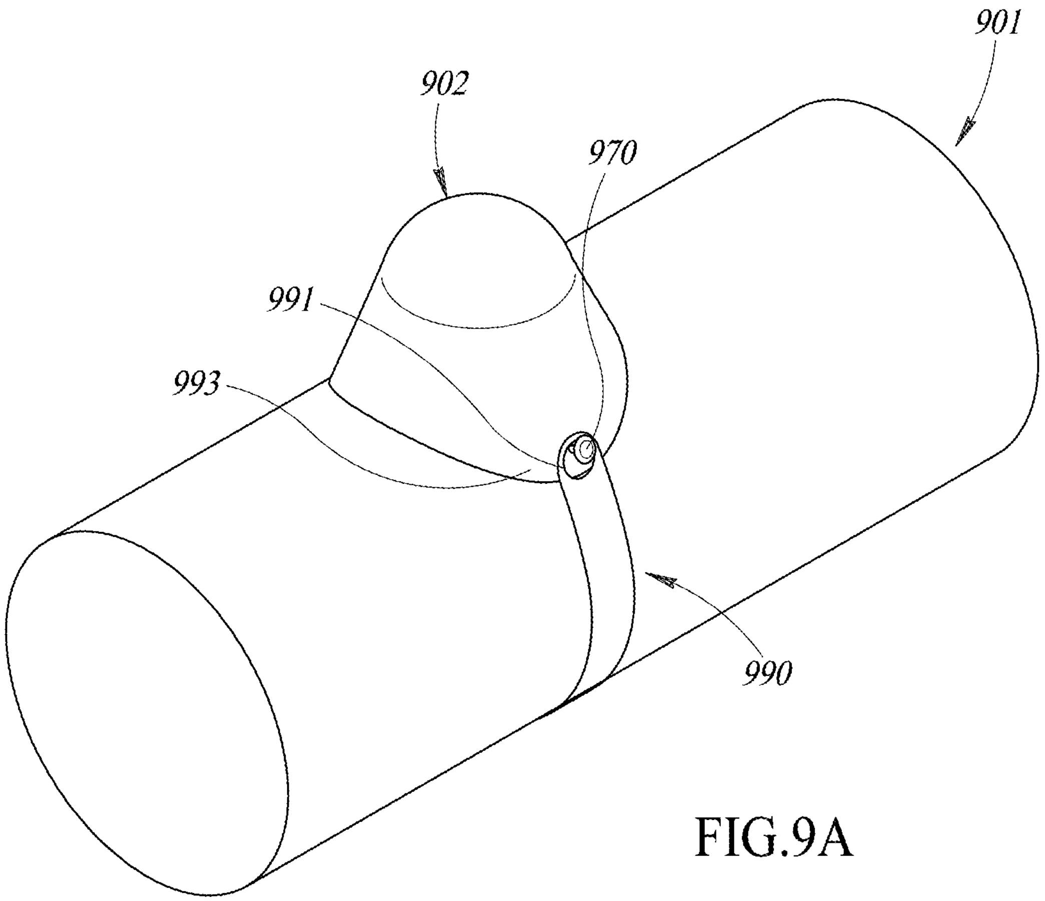
FIG. 9A is a pictorial view of a massage device and a foam roller according to another implementation of the present disclosure.
Figure 9B:
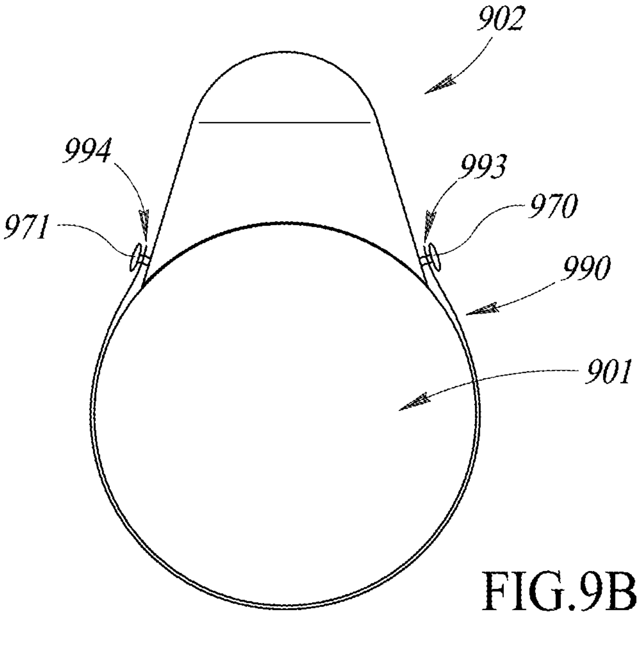
FIG. 9B is a side view of the massage device and the foam roller of FIG. 9A.

FIGS. 9A-9B illustrate an alternative implementation of a massage device 902 coupled to a roller 901 using a strap 990. The strap includes a first end 993 and a second end 994. The first end 993 has an aperture 991 that engages with a protrusion 970, and the second end 994 engages with a corresponding protrusion 971 to couple the massage device 902 to the roller 901. Although depicted as having a single strap coupling the massage device 902 to the roller 901, in some implementations additional straps couple the massage device 902 to the roller 901.

In some implementations, other structures or means are used to couple the massage device 902 to the roller 901. For example, hook-and-loop fasteners, glue, epoxy, or other coupling devices can be used to couple the massage device 902 to the roller 901. In some implementations, a strap is orientated longitudinally and engages at the ends of the roller 901 instead of around the sides as shown in FIG. 9A.

Figure 10A:
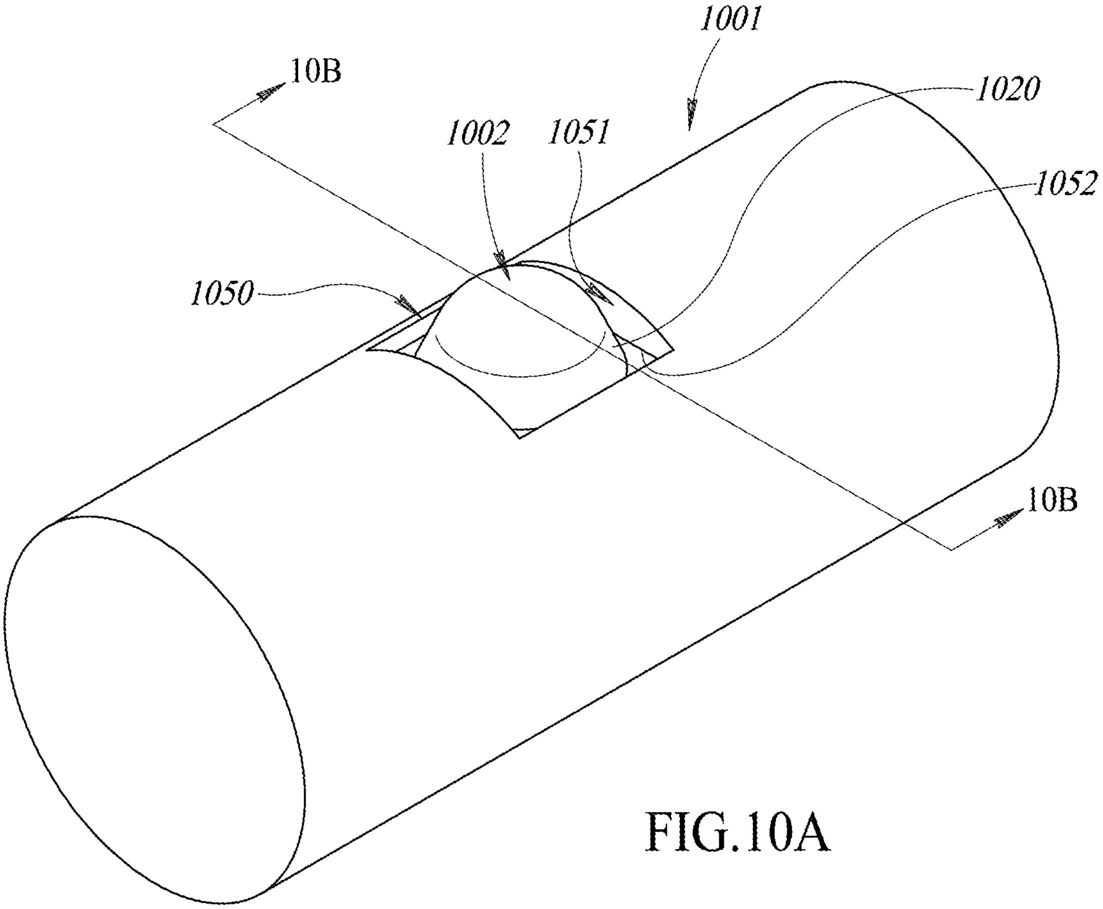
FIG. 10A is a pictorial view of a massage device and a foam roller according to another implementation of the present disclosure.
Figure 10B:
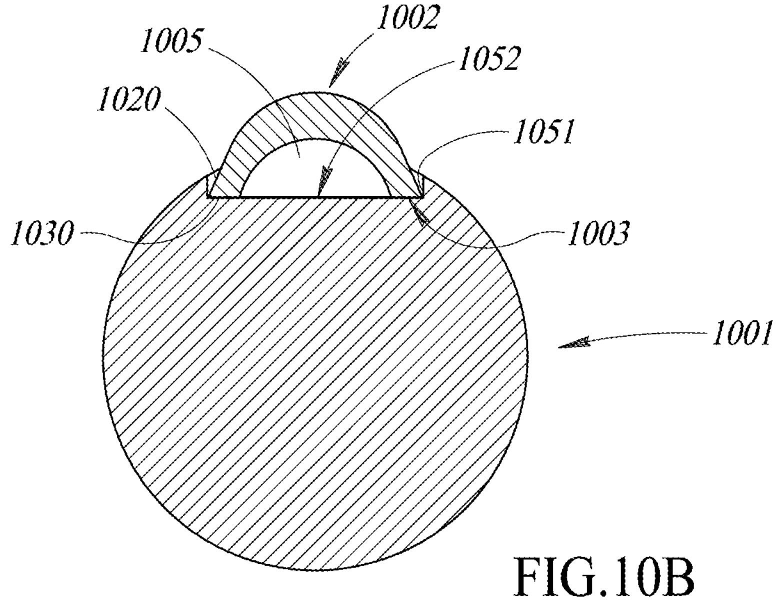
FIG. 10B is a cross-section view of the massage device and the roller of FIG. 10A through the line 10B-10B.

FIGS. 10A-10B illustrate an implementation of a massage device 1002 embedded in a roller 1001. The roller 1001 includes an opening 1050 sized and shaped or otherwise configured to receive the massage device 1002. The massage device 1002 preferably has an interference fit with the opening 1050. For example, an undeformed diameter of the base 1030 of the massage device 1002 can be larger than a dimension, such as the length, width, or diameter, of the opening 1050. With an interference fit, a user can press the massage device 1002 into the opening 1050. This causes the sidewalls 1020 or base 1030 of the massage device 1002 two deform such that it presses against the inner surface 1051 of the opening 1050. In some implementations, the opening is square, as shown in FIGS. 10A-B, round, as shown in FIGS. 11A-B, or can have any other shape that facilitates engaging a massage device.

In some implementations, the massage device 1002 couples or attaches to the roller 1001 through other or additional means. For example, in some implementations, the lower surface 1052 of the opening 1050 and the base 1030 of the massage device 1002 include couplers, such as hook-and-loop fasteners.

FIG. 10B is a cross section through line 10B-10B and shows the lower surface 1052 where the bottom surface 1003 of the massage device 1002 rests. An interior cavity 1005 of the massage device 1002 is also visible in the cross section.

Figure 11A:
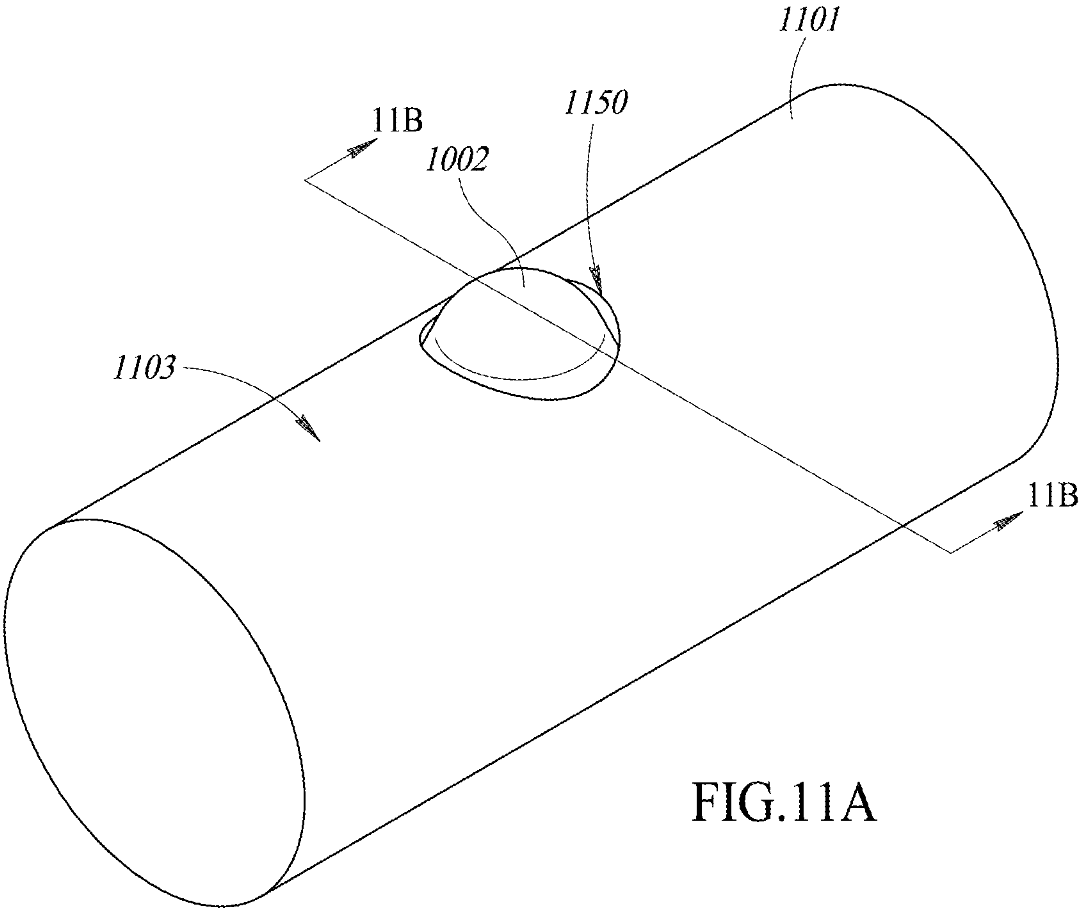
FIG. 11A is a pictorial view of a massage device and a foam roller according to an implementation of the present disclosure.
Figure 11B:
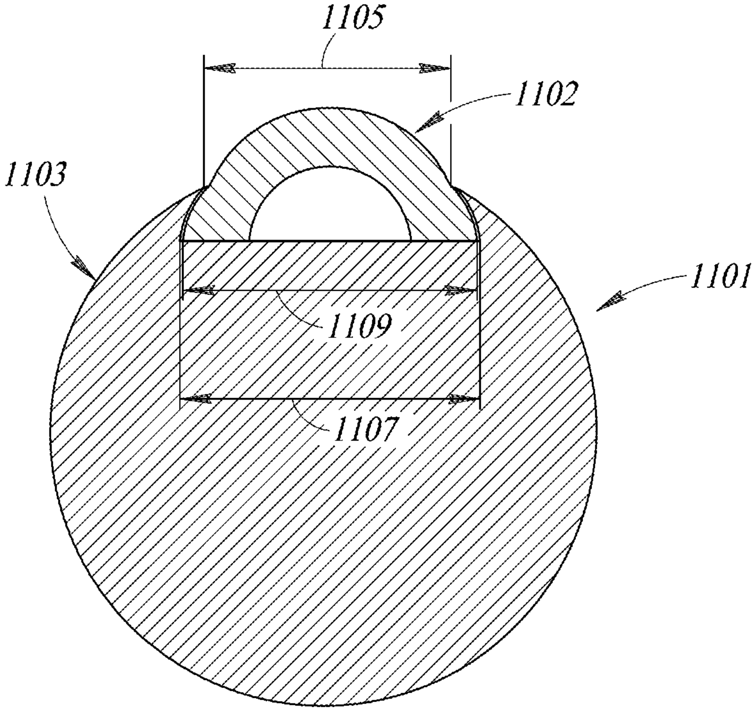
FIG. 11B is a cross-section view of the massage device and the roller of FIG. 11A through the line 11B-11B.

FIG. 11A is a pictorial view of a roller 1101 with an opening 1150. The opening 1150 has a smaller diameter 1105 at a surface 1103 of the roller than a widest diameter 1109 of the massage device (e.g., 1002 in FIG. 11A, 1102 in FIG. 11B, which is a cross section through line 11B-11B). The massage device 1002 can have a silicon or other flexible bottom portion that allows the massage device 1002 to be manipulated to fit within in the opening. In addition, an interior diameter 1107 of the opening, which corresponds to a bottom surface of the opening, is larger than the diameter 1105 at the surface 1103.

FIGS. 12A-12F show an alternative implementation of a massage device 1200 according to an implementation of the present disclosure. The massage device 1200 is a stand-alone device configured to be positioned and remain stationary or temporarily fixed to a surface, such as a table or the floor, during use. The massage device 1200 includes a top portion or main body 1206 having curved sides that culminate in a dome or otherwise smoothly curved top surface. The main body 1206 can have shapes, structures, and other features matching those of any one of the massage devices 100, 200, 300, or 400, and can comprise a slick smooth polished plastic or rubbery, sticky material that grips clothing or skin of a user. The main body 1206 is formed by any one of various suitable fabrication techniques, such as cavity pour molding, injection molding, or by 3-D printing techniques. The 3-D printing techniques can naturally leave small ridges or ribs on the surface of the main body 1206, which can aid in a massage by making the main body 1206 rougher. 3-D printing techniques can also be selected to leave patterned internal open spaces within the main body 1206, such as to reduce material costs. The main body 1206 is formed from any one of various suitable materials, such as ethylene vinyl acetate (EVA) foam, and includes an outer, self-hardening shell surrounding an internal foam material.

The main body 1206 has a surface roughness that allows a user to slide their body smoothly across the main body 1206 in a controlled manner. In some implementations, a surface of a metallic mold used to form the main body 1206 is texturized to provide the main body 1206 with the surface roughness. In some implementations, the surface of the mold is texturized to have a surface roughness corresponding to sandpaper having a CAMI grit designation of 24, 30, 36, 40, 50, 60, 80, 100, 120, 150, 180, 220, 240, 320, 360, 400, 500, 600, 800, or 1000, such that the molded main body 1206 has a surface roughness corresponding to the negative of such a surface. In other implementations, the main body 1206 has a surface roughness corresponding to sandpaper having one of the CAMI grit designations listed above, or corresponding to the negative or a melamine foam, or corresponding to the roughness or height of human fingerprints.

In another implementation, the massage device 1200 includes ridges that have a height of 1 millimeter to 1 centimeter. The ridges may have curved, smooth edges.

The massage device 1200 also includes a base portion or shoe 1208 positioned on a bottom end portion of the main body 1206. The shoe 1208 is either removable from the main body 1206 or is formed integrally with the main body 1206. The shoe 1208 provides a bottom surface 1202 of the massage device 1200 and includes an outer lip or edge 1210 that extends up a small portion of the sides of the main body 1206 to secure the shoe 1208 to the main body 1206. The shoe 1208 includes an inner lip 1212 along an interior of the shoe 1208 surrounding a central opening formed in the shoe 1208 that is sized and shaped to more securely hold the main body 1206 to the shoe 1208. The bottom surface 1202 has a shape comprising a square having rounded corners 1204 and an opening formed at a center thereof, the opening having a shape comprising a square having rounded corners. The shoe preferably is formed of a material (e.g., a thermal plastic elastomer (TPE), a rubber, a silicone, etc.), such as at the bottom surface 1202, configured to grip and hold the massage device 1200 in place on the surface during use.

The shoe or base is optional. The device 1200 can be used on a floor or wall without the shoe or base. In some implementations, the devices described herein are configured to grip the floor or wall when pressure is applied to maintain the device in place as the user moves along the device. For example, if used on carpet, the carpet threads are compressed under the bottom surface of the device and interact with the edges adjacent to the bottom surface both on the exterior and interior portions of the device. The bottom surface may be textured to grip the surface on which it is placed.

For example, if the surface is a wood floor that has a relatively low coefficient of friction (e.g., a static or a dynamic coefficient of friction) and is relatively smooth or slick, the shoe can comprise a suitably (e.g., highly) adhesive, gripping, or otherwise textured bottom surface 1202 that can better grip the slick surface. If the surface is a rough concrete floor that has a relatively high coefficient of friction and is relatively rough, the shoe 1208 can comprise a less adhesive bottom surface 1202, which can be formed of a different plastic than the main body 1206.

In some implementations, a massage device kit includes a plurality of main bodies 1206 and a plurality of shoes 1208, where each of the main bodies 1206 have a different surface roughness with respect to each other, and where each of the plurality of shoes 1208 comprise a bottom surface formed from a different material and having a different coefficient of friction. A user can then select a main body 1206 based on a desired surface roughness and a shoe 1208 based on the coefficient of friction of the surface that the massage device 1200 is to be used on, and install the selected shoe 1208 on the selected main body 1206 prior to using the massage device 1200.

The massage device 1200 has a shape in plan view that comprises a square with rounded corners. In alternative implementations, such as that shown in FIG. 12G, a massage device 1200A is elongated, such that its shape in plan view comprises a rectangle, not a square. For example, the massage device 1200A in certain implementations has a shape in plan view that comprises a length and a width, the length being at least 1.5 times, at least 2.0 times, at least 3.0 times, at least 5.0 times, or at least 10 times the width. In certain implementations, the width is about 3 inches, about 4 inches, about 5 inches, about 6 inches, about 7 inches, or about 8 inches, and the length is at least 6 inches, at least 9 inches, at least 12 inches, at least 16 inches, at least 18 inches, at least 24 inches, at least 36 inches, or at least 48 inches. In such alternative implementations, the curvatures and angles of the various surfaces of the main body 1206A and shoe 1208A, such as the bottom surface 1202A and outer lip 1210A, remain as described elsewhere herein, such as with respect to the massage device 1200. The elongated shape of the massage device 1200A allows the massage device 1200A to effectively and completely replace a foam roller such as the foam roller 801.

Figure 12A:
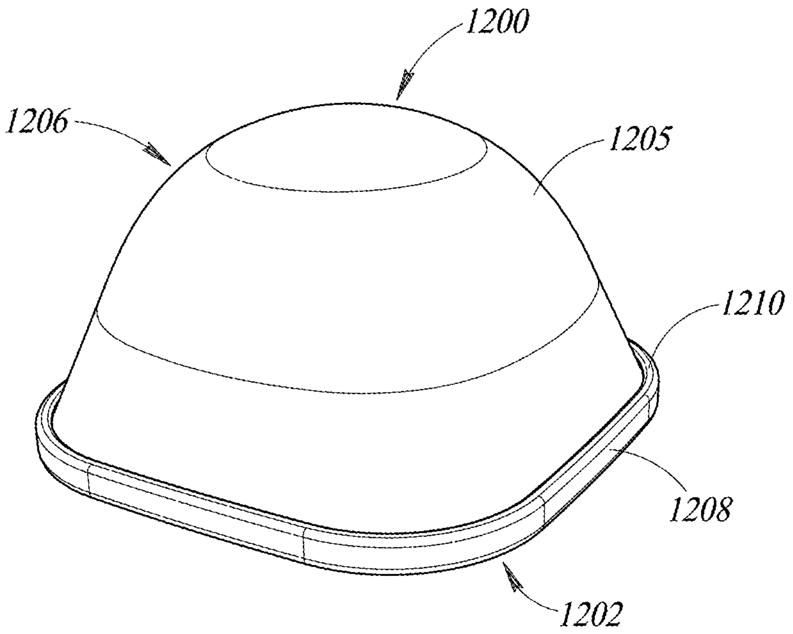
FIGS. 12A, 12B, and 12C are top pictorial, top, and bottom pictorial views, respectively, of an alternative implementation of a massage device according to an implementation of the present disclosure.
Figure 12B:
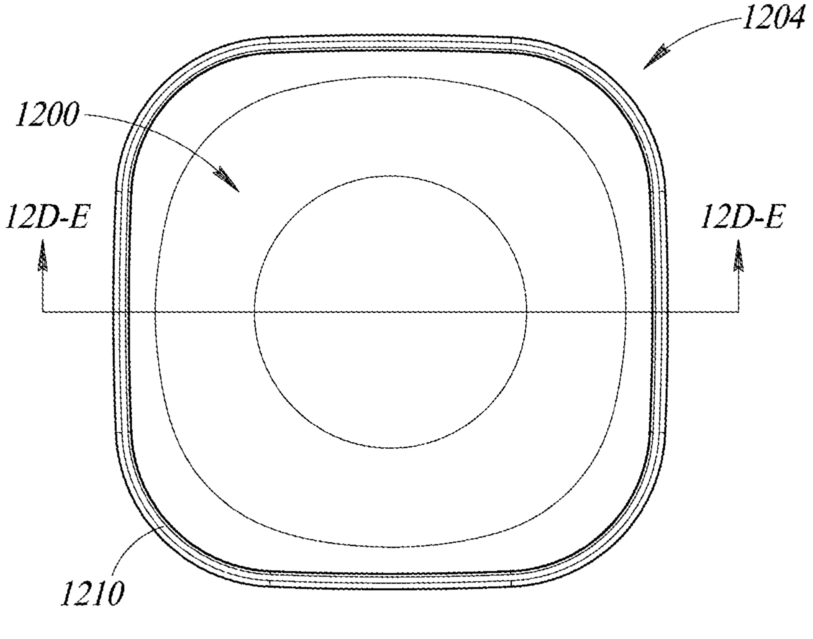
Figure 12C:
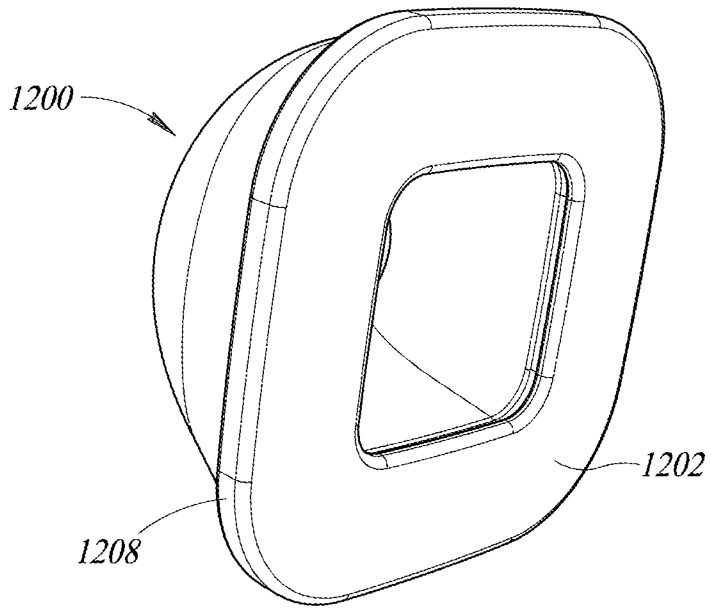
Figure 12D:
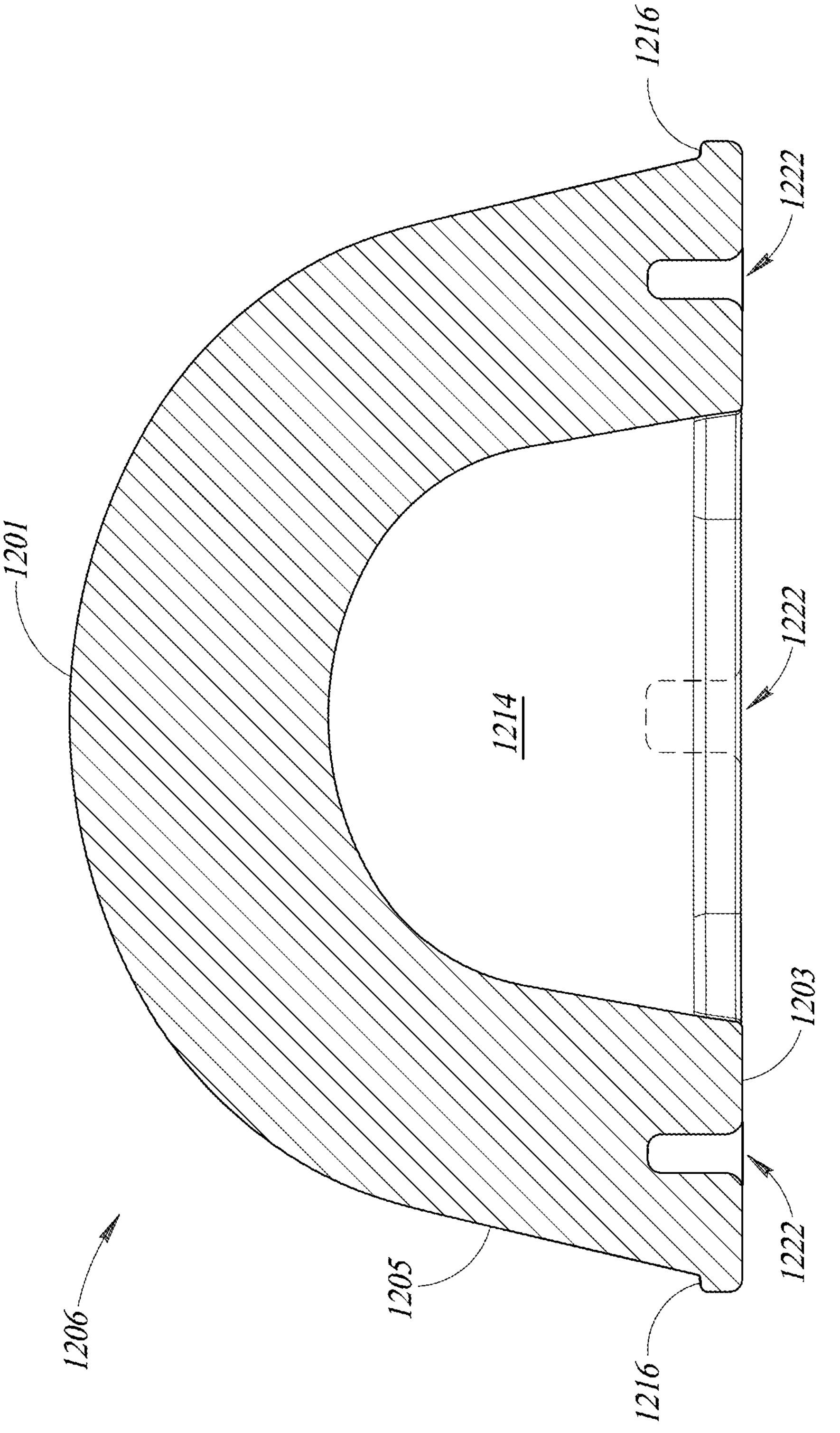
FIGS. 12D and 12E are cross-sectional views of components of the massage device of FIGS. 12A-12C taken along line 12D-E-12D-E in FIG. 12B.
Figure 12E:
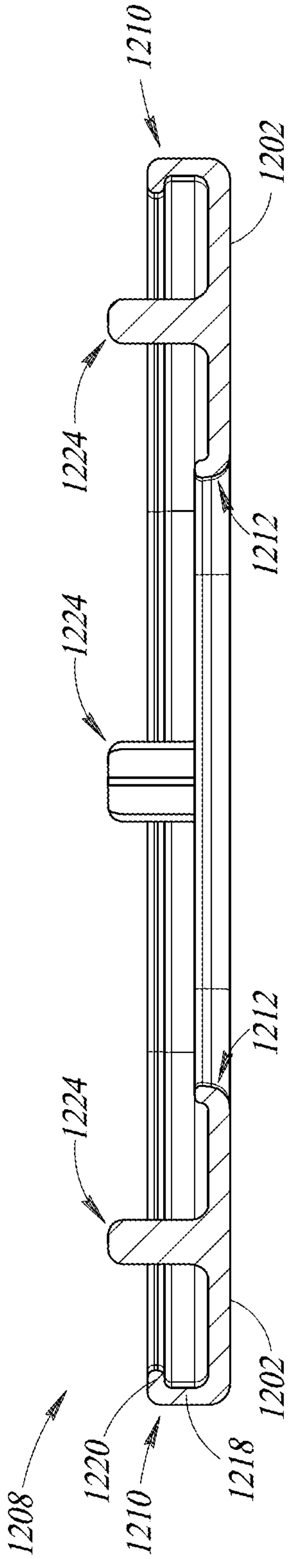

FIG. 12D shows the main body 1206 in cross section, and shows that the main body 1206 having a hollow interior 1214 and a peripheral, radially extending lip or ridge 1216 that extends peripherally around an entire bottom end of the main body 1206. The hollow interior 1214 is sealable as a storage compartment when used in conjunction with the optional shoe 1208. FIG. 12E shows the shoe 1208 in cross section, and shows that the shoe 1208 having the bottom surface 1202, the outer lip 1210, and the inner lip 1212. The outer lip 1210 includes a vertical portion 1218 and a horizontal portion 1220 that extends radially inward from a top end of the vertical portion 1218. The inner lip 1212 has a vertical portion that is relatively shorter than the vertical portion 1218 of the outer lip 1210. The outer lip 1210 preferably extends around an entire outer periphery of the shoe 1208, and the inner lip 1212 preferably extends around an entire inner periphery of the shoe 1208.

Figure 12F:
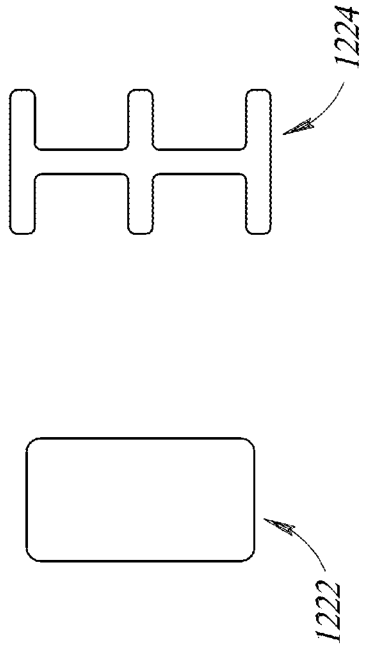
FIG. 12F illustrates bottom and top views of components of the massage device of FIGS. 12A-12C.
Figure 12G:
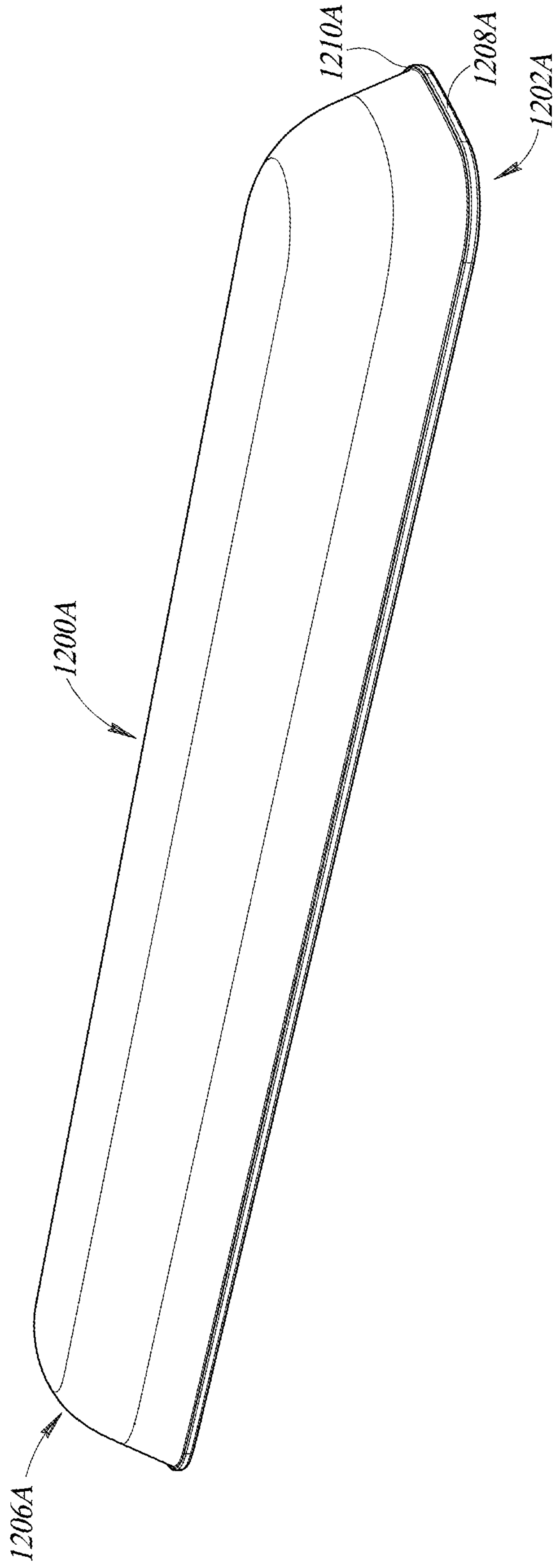
FIG. 12G illustrates a top pictorial view of an elongated massage device similar to the massage device of FIGS. 12A-12C, according to another implementation of the present disclosure.

FIG. 12D also shows that the main body 1206 includes a plurality of recesses 1222 formed in a bottom end thereof. As one example, the main body 1206 includes one recess 1222 formed in and centered on each of the four sides of the bottom end thereof. FIG. 12E also shows that the shoe 1208 includes a corresponding plurality of protrusions 1224 formed in a top end thereof. For example, the shoe 1208 can include one protrusion 1224 formed in and centered on each of the four sides of the top surface thereof. FIG. 12F shows a bottom view of an example of the recesses 1222. The recesses 1222 can have a generally rectangular shape, and a top view shows an example of the protrusions 1224, which can have a shape comprising a single vertical strip of material and three equally spaced horizontal strips of material centered on and intersecting the vertical strip of material.

The recesses 1222 have an overall shape that is slightly smaller than the overall shape of the protrusions 1224, such that the protrusions 1224 frictionally engage with the outer walls of the recesses 1222 when positioned therein. The recesses 1222 and the protrusions 1224 help to hold the shoe 1208 on the main body 1206 when the massage device 1200 is assembled. In some cases, the main body 1206 and the shoe 1208 are formed without the recesses 1222 and the protrusions 1224, respectively, and an adhesive such as glue or an epoxy can be used to hold the massage device 1200 together once assembled. In some cases, the recesses 1222 and the protrusions 1224 can be used in combination with such an adhesive.

To assemble the massage device 1200, a user first selects a shoe 1208 having a bottom surface with a desired coefficient of friction. If desired, the user can then apply an adhesive, glue, or the constituent parts of an epoxy to the main body 1206 or the shoe 1208. The user then inserts the lip 1216 of the main body 1206 into the outer lip 1210 of the shoe 1208, and in particular under the horizontal portion 1220 of the outer lip 1210 of the shoe 1208. The user can then set the main body 1206 down on the shoe 1208 such that a bottom surface of the main body is bounded on the inside by the inner lip 1212 of the shoe 1208 and on the outside by the outer lip 1210 of the shoe 1208. The user can then manipulate the shoe 1208, which can be formed from a pliable material, to ensure that the horizontal portion 1220 of the outer lip 1210 covers the entirety of the lip 1216. The user can also then position the bottom surface 1202 of the massage device 1200 on a surface such as a wall, a tabletop, or a floor, and use the massage device 1200 to perform a massage.

In an alternative implementation, the device 1200 includes steep sidewalls 1205 that transition from a bottom surface 1203 to a top 1201 of the dome. The sidewalls 1205 may be come nearly vertical, such as at a 75-85 degree angle with respect to the bottom surface. The sidewalls smoothly transition into the curved top surface.

Figure 13A:
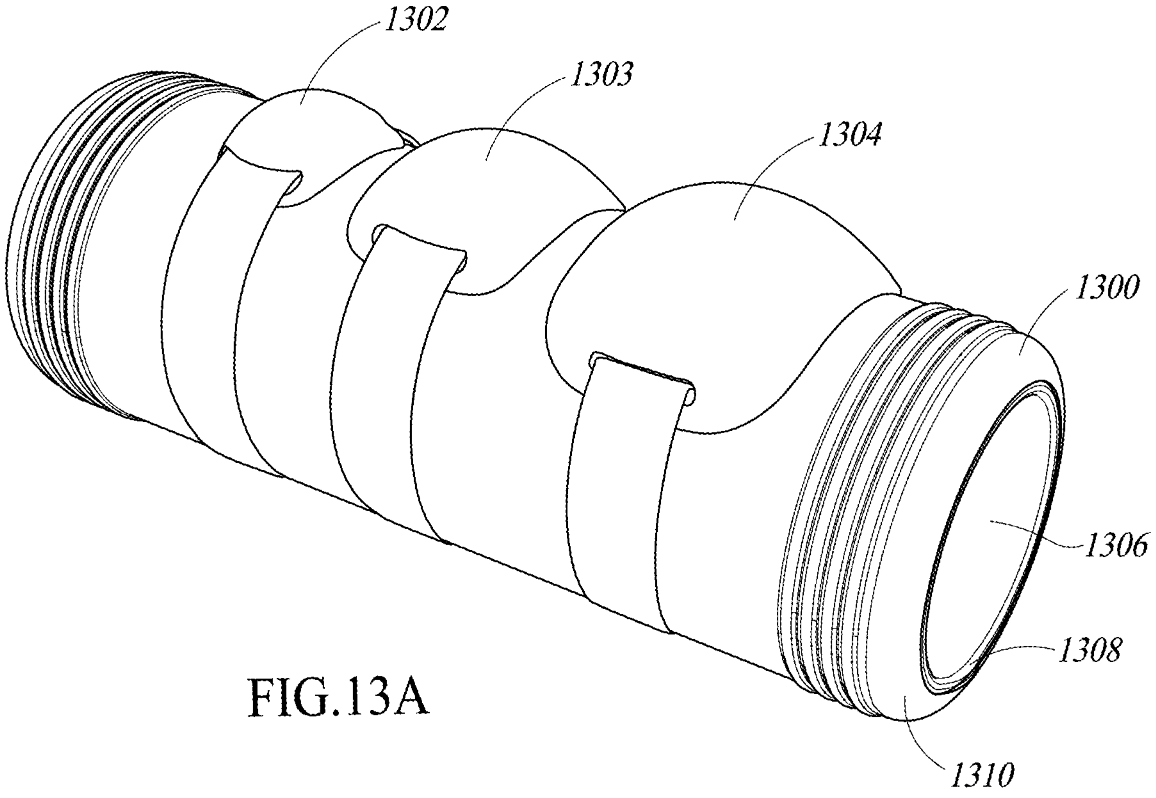
FIGS. 13A and 13B are top pictorial and top views, respectively, of a roller having removable massage devices attached to the roller.
Figure 13B:
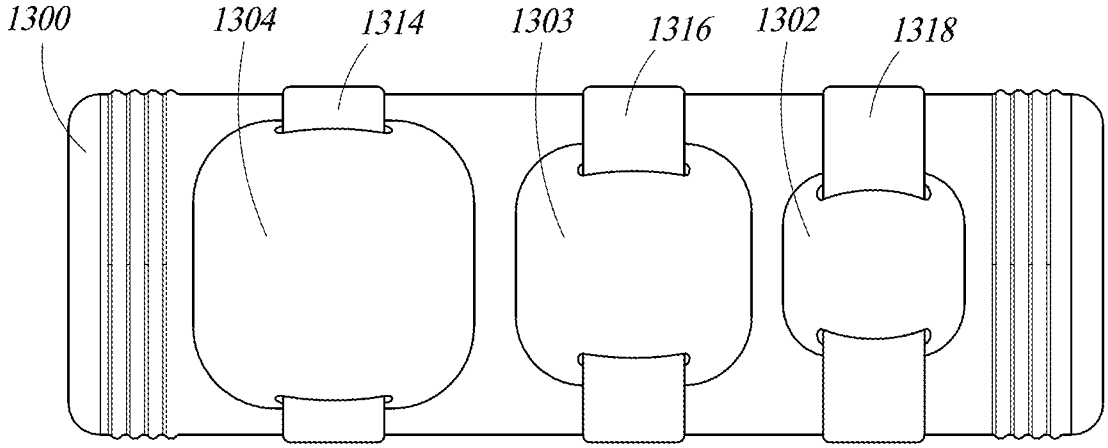

FIGS. 13A-13B show a roller 1300 having a plurality of removable massage devices 1302, 1303, 1304 attached to the roller. The roller 1300 is a foam roller that can have a hollow core 1306. The roller has a hollow center 1308 with a malleable resilient exterior 1310. The hollow center is sized and shaped to be a storage compartment for one or all of the removable massage devices 1302, 1303, 1304. The three illustrated massage devices ideally are configured to be nested so that they stack onto each other easily and are storable within the hollow compartment. In other implementations, the center is not hollow. A texture of an exterior of the foam roller can be the same as a texture of the top surface of each massage device. Alternatively, the texture of the foam roller can be more resilient while the top surface of the massage device is rigid and slick, i.e., has less grip or texture than the foam roller.

Each of the massage devices 1302, 1303, 1304 have a generally square shape associated with a bottom surface. The bottom surfaces are the surfaces that face and contact the roller. The bottom surfaces are either curved to match a curvature of the roller or bendable to adjust to the curvature of the roller. A top surface of each of the massage devices is curved or otherwise rounded, such that each massage device adds a different curvature and thus a different type of massage to the roller.

Each massage device includes a band 1314, 1316, 1318 that fits around and holds the massage device on the roller. The bands can be elastic to snuggly attach the massage device to the roller. Alternatively, the bands can be nylon or other fabric that is sized and dimensioned to hold the massage device in place on the roller. In one implementation, the band is sewn on to the bottom surface of the massage device such that the band cannot be opened and is a single loop. In other implementations, which are described in more detail below, the band has two parts that are coupled together, such as with hook-and-loop fastener material or with a strap.

Figure 14:
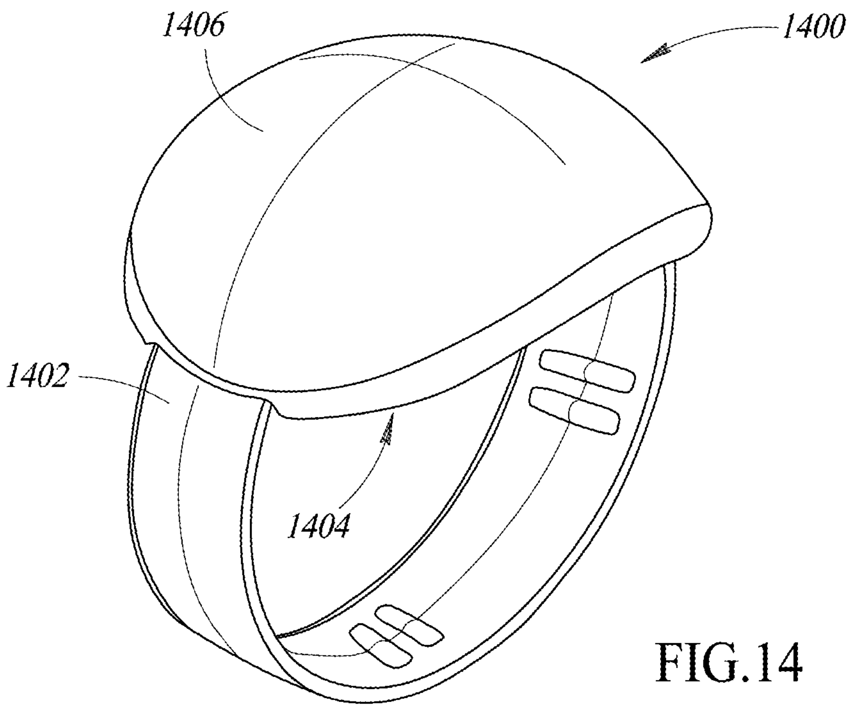
FIGS. 14-18 illustrate are alternative implementations of a massage device to be attached to a roller.

FIG. 14 illustrates an alternative massage device 1400 that is configured to be attached to a foam roller. The massage device includes a band 1402 that is fixed to a bottom surface 1404 of a massage dome 1406. The dome 1406 has a curved top surface and a curved bottom surface. The curvature of the top and bottom surfaces can be the same, which will match a curvature of an associated roller. In an alternative implementation, the curvature of the top surface will be different from the curvature of the bottom surface.

The band 1402 can be sewn onto opposite ends of the dome 1406. Alternatively, the band can be a single piece that is attached with hook-and-loop fastener material to the bottom surface of the dome.

Figure 15:
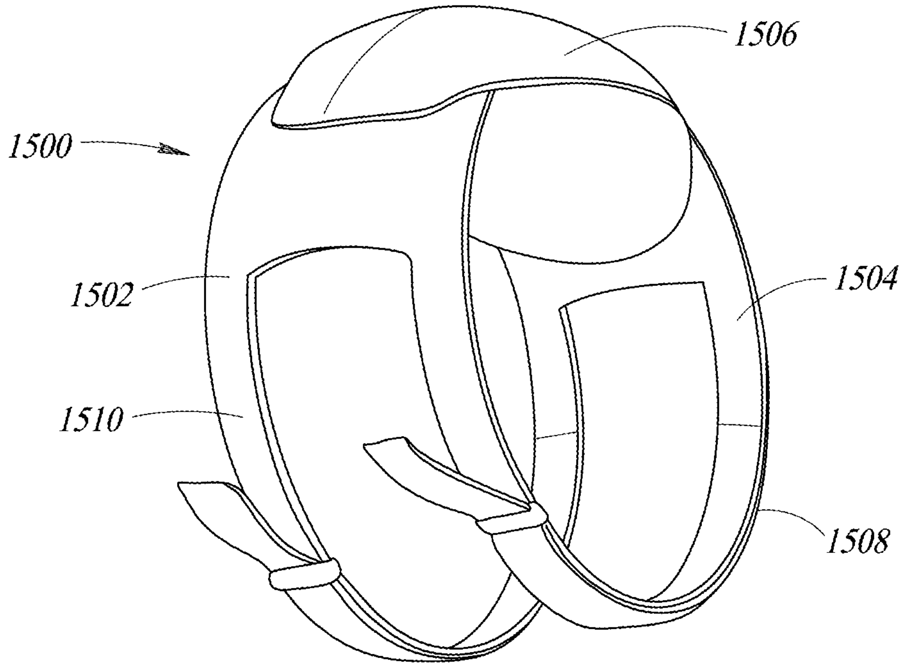

FIG. 15 illustrates an alternative implementation of a massage device 1500 having a curved massage portion 1506 and first and second straps 1502, 1504 extending from ends of the device. Each strap is split into two bands 1508, 1510. The bands 1508, 1510 of the second strap 1504 are configured to interact with the bands 1508, 1510 of the first strap 1502 to wrap the massage device 1500 around a roller.

Figure 16:
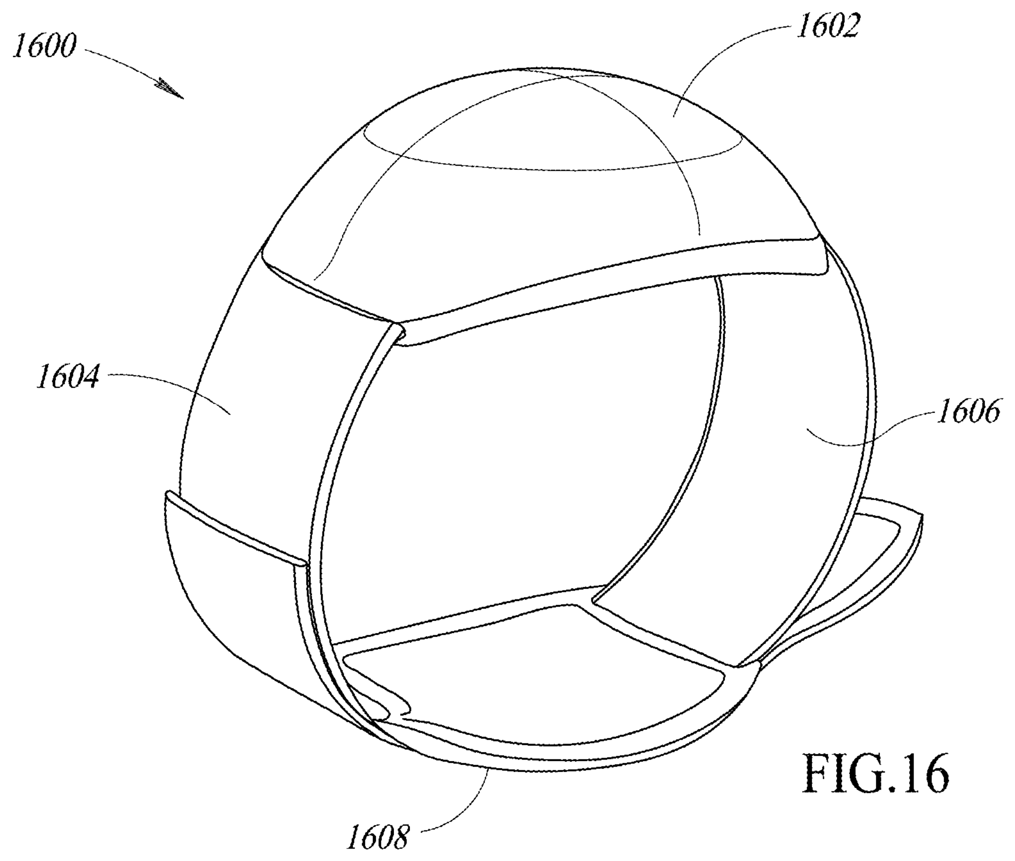

FIG. 16 illustrates an alternative implementation of a massage device 1600 having a massage portion 1602 with a first band 1604 and a second band 1606. The massage device

1600 includes a clasp 1608 that is fixedly attached to the second band 1606 and is configured to clasp or lock in place an end of the first band 1604.

Figure 17:
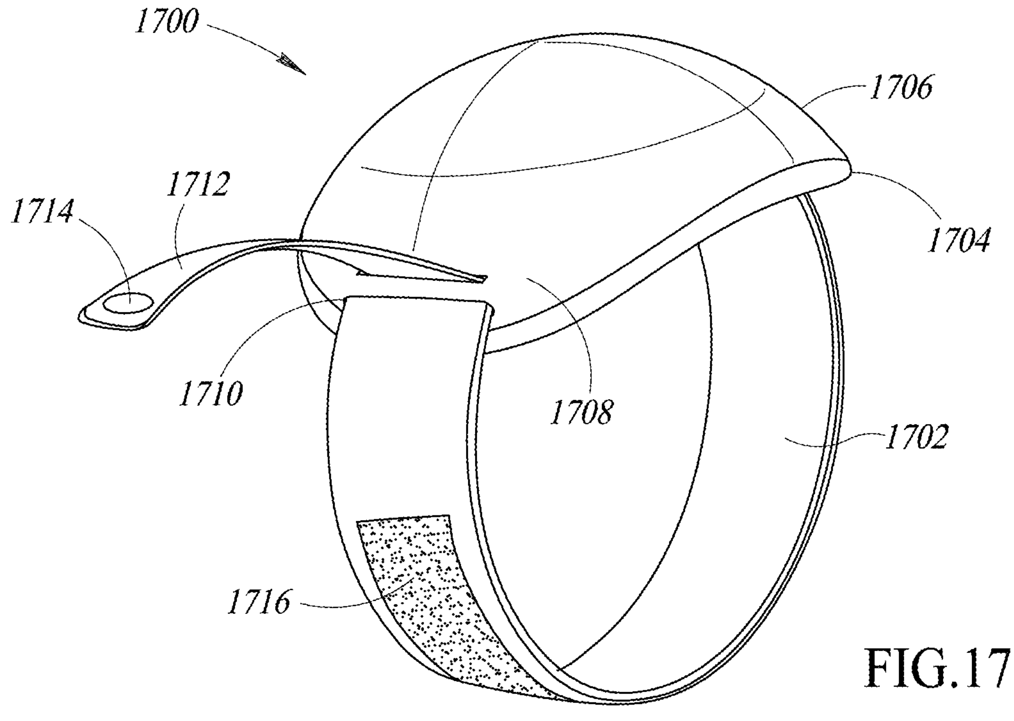

FIG. 17 illustrates an alternative implementation of a massage device 1700 having a single band 1702 that is fixedly attached to a first end 1704 of massage portion 1706. The band can be integrally formed with the massage portion 1706 or can be sewn on to the massage portion 1706 or otherwise attached to the massage portion 1706. At a second end 1708 of the massage portion 1706, there is an opening 1710 through which an end 1712 of the band 1702 can pass. The end 1712 includes an attachment element 1714 to couple to a portion 1716 of the band 1702 to easily add this massage device 1700 to any sized roller.

Figure 18:
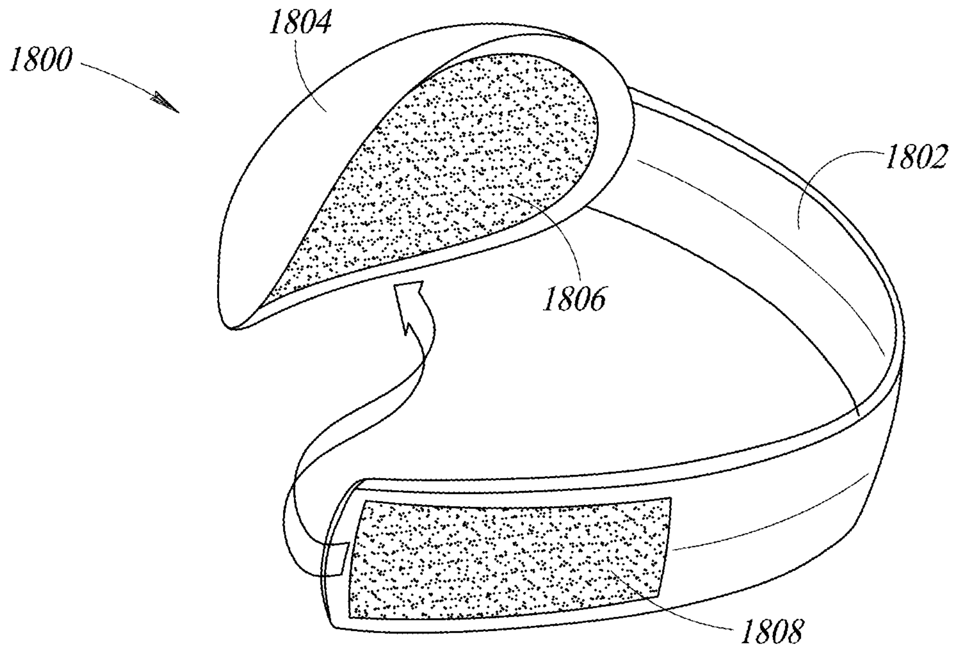

FIG. 18 illustrates an alternative implementation of a massage device 1800 having a single band 1802 integrally formed with a massage dome 1804. A bottom surface 1806 of the massage dome is covered in hook-and-loop fastener material that is configured to couple with mating hook-and-loop fastener material on an end 1808 of the band.

Figure 19:
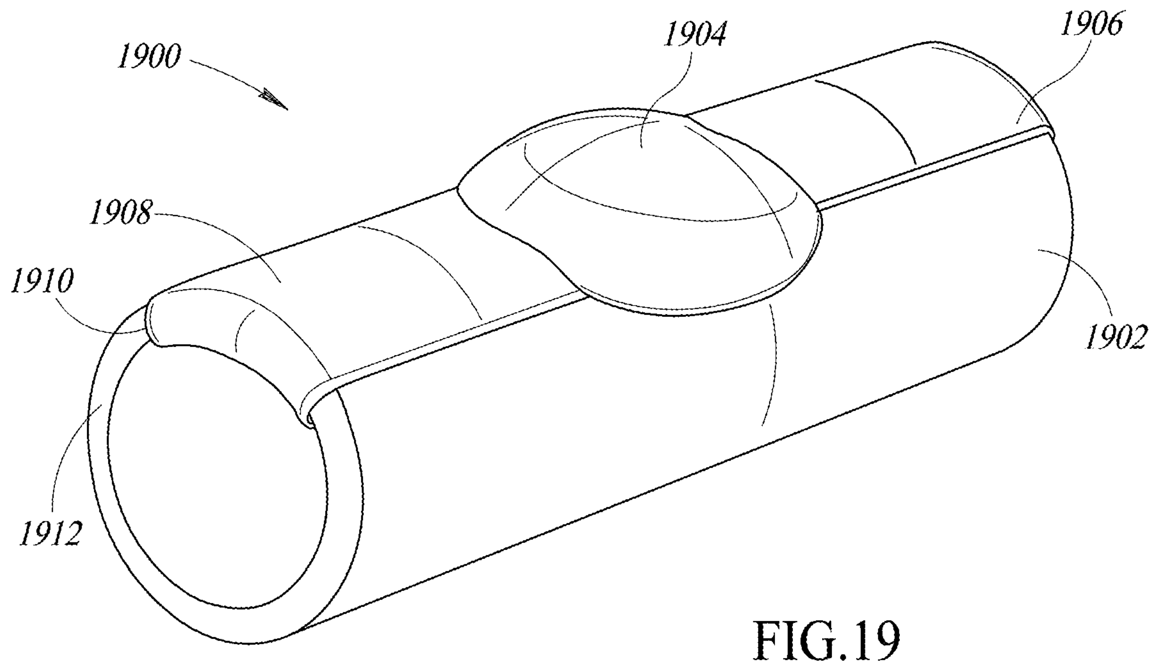
FIG. 19 illustrates an alternative implementation of a massage device attached to a roller.

FIG. 19 illustrates an alternative implementation of a massage device 1900 attached to a roller 1902. The massage device 1900 includes a massage dome 1904. A first strap 1906 extends from a first side of the massage dome 1904 and a second strap 1908 extends from a second side of the massage dome 1904. Each strap 1906, 1908 has an end 1910 that couples to an end 1912 of the roller 1902 to hold the massage dome 1904 on the roller 1902.

Figure 20:
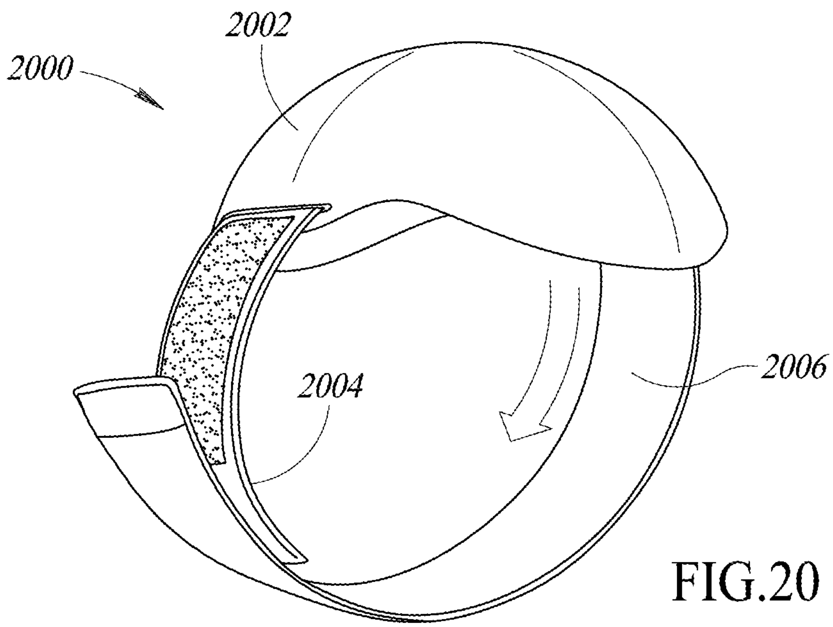
FIGS. 20-22 illustrate alternative implementations of a massage device to be attached to a roller.

FIG. 20 illustrates an alternative implementation of a massage device 2000 having a massage component 2002, a first strap 2004, and a second strap 2006. The first strap includes a hook-and-loop fastener material portion that is configured to interact with a hook-and-loop fastener material portion of the second strap. This allows the massage device to be attached to any sized foam roller.

Figure 21:
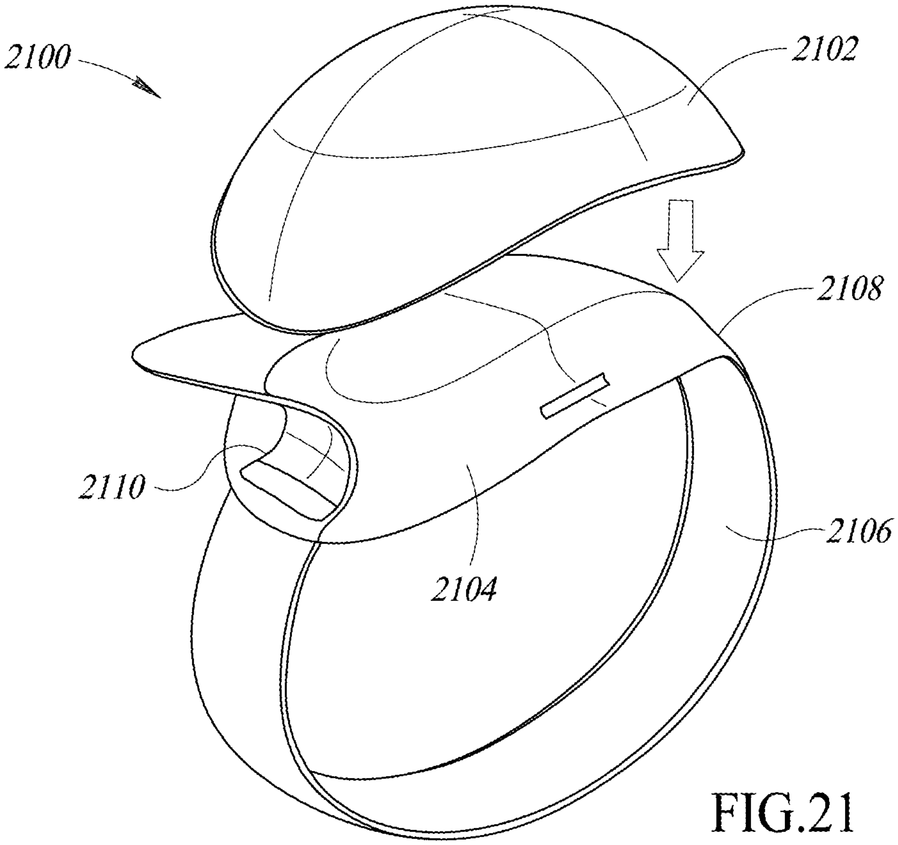

FIG. 21 illustrates an alternative implementation of a massage device 2100 that has a massage portion 2102, a base 2104, and a strap 2106. The strap is integrally formed with a first end 2108 of the base 2104. A second end 2110 of the base 2104 includes an opening through which the strap 2106 can be pulled so that a diameter of the strap 2106 can be adjusted to accommodate a variety of roller sizes. The strap 2106 is attached to the massage portion 2102 so that when the massage portion 2102 is removed from the base 2104, the strap 2106 can be adjusted and folded under the massage portion 2102. The massage portion 2102 can be locked into place on the base 2104. The massage portion 2102 can include a groove or indentation in a bottom surface to accommodate the folded strap 2106.

Figure 22:
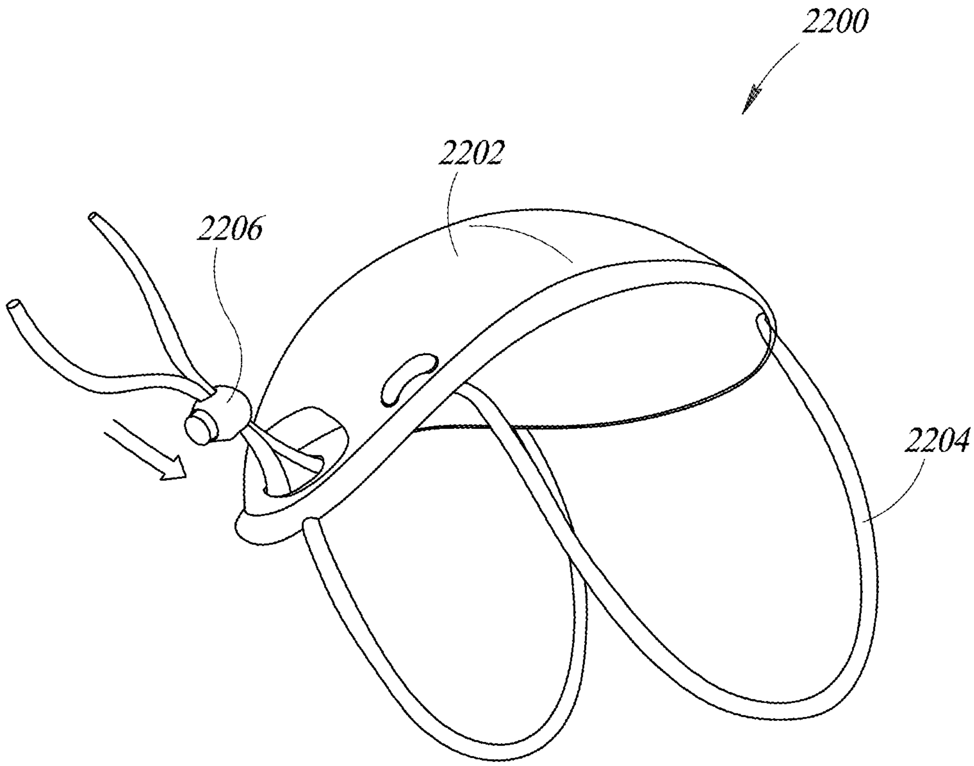

FIG. 22 illustrates an alternative implementation of a massage device 2200 that has a massage portion 2202 and a loop-shaped strap 2204. The massage portion 2202 includes small openings through which the strap 2204 is threaded. A clasp 2206 is provided to cinch the strap 2204 down to accommodate a variety of roller sizes.

Each of the massage devices described above can be high density plastic with little give to provide a strong, sharp, pressure point massage. Alternatively, the massage devices, for example the massage domes and massage portions, can be firm to slightly soft, such as a resilient rubber that has a slight give but is otherwise rigid.

Figure 23:
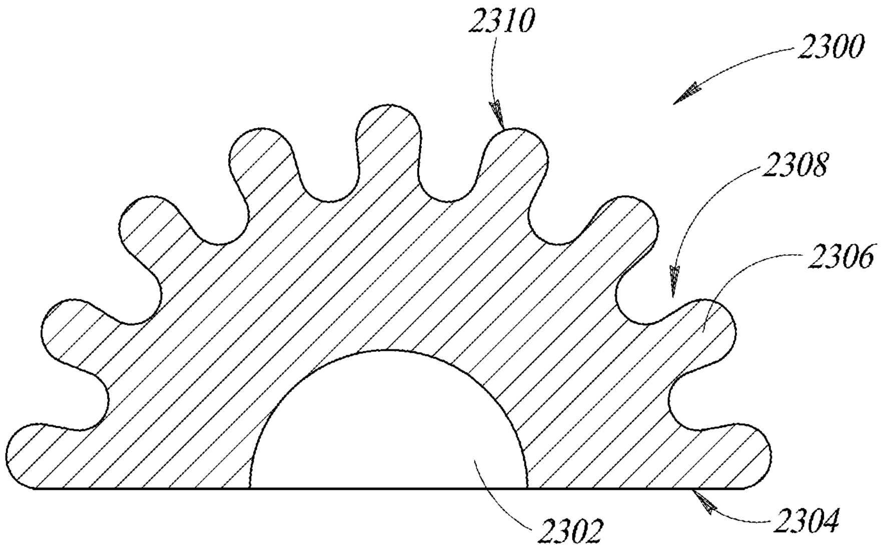
FIG. 23 is a cross-sectional view of an alternative implementation of a massage device according to an implementation of the present disclosure.

FIG. 23 illustrates a cross-sectional view of an alternative implementation of a massage device 2300, which is similar to the massage devices described with respect to at least FIGS. 1A, 2A, 3A, and 4A. There is a hollow portion 2302 in a central area of a bottom surface 2304. The hollow portion 2302 could be larger or smaller than shown. This hollow portion 2302 helps reduce the overall weight of the massage device 2300.

An outer surface 2308 of the massage device 2300 includes at least one, and in some implementations, a plurality of bumps 2306 instead of being a smooth surface as shown in prior implementations. The bumps 2306 can all be the same size and shape or can be an irregular size and shape. The massage device can be made of a firm, but resilient material such that when a user presses their muscle into the massage device, the bumps 2306 give some, while maintaining their shape. The bumps have rounded external surfaces 2310. In other implementations, these surfaces can be truncated to have a flat external surface. In one implementation, the bumps are evenly spaced hemispheres with each having a size corresponding to that of a golf ball or a tennis ball, or having a diameter in the range of 0.5-2.0 centimeters, or having a diameter in the range of 2.5 to 3.0 inches. The entire outer surface 2308 can be covered in the evenly spaced hemispheres. In alternative implementations, the other massage devices described herein include at least one of, or a plurality of, such bumps.

Figure 24A:
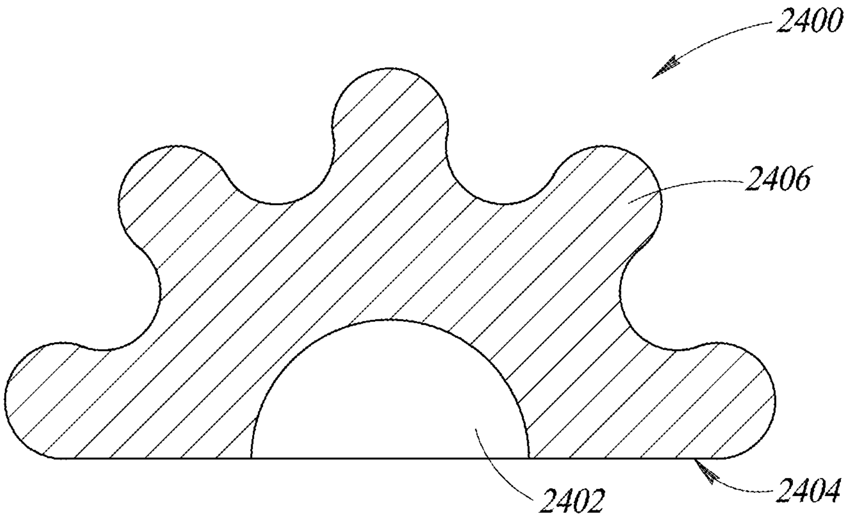
FIGS. 24A and 24B are a cross-sectional view and a pictorial view, respectively, of an alternative implementation of a massage device according to an implementation of the present disclosure.

FIG. 24A is a cross-sectional view of an alternative implementation of a massage device 2400, which is similar to the massage devices described with respect to at least FIG. 23. There is a hollow portion 2402 in a central area of a bottom surface 2404. The hollow portion 2402 could be larger or smaller than shown. Protrusions 2406 can be larger hemispherical protrusions or oblong protrusions.

Figure 24B:
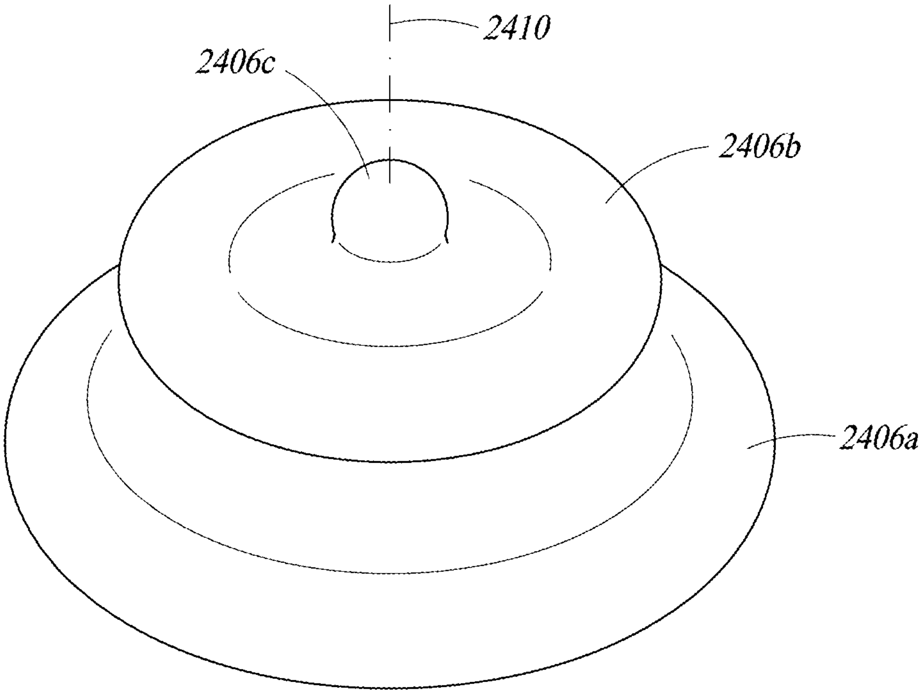

FIG. 24B illustrates an alternative implementation of the device 2400 that includes a plurality of rounded protrusions 2406*a*, 2406*b*, and 2406*c*. Each protrusion in cross section is a single protrusion around a central axis 2410 of the device, such that the full device would include a first protrusion 2406*a*, a second protrusion, 2406*b*, and a third protrusion 2406*c*. The third protrusion extends vertically along the central axis 2410. The device is symmetrical around the central axis 2410.

Figure 25:
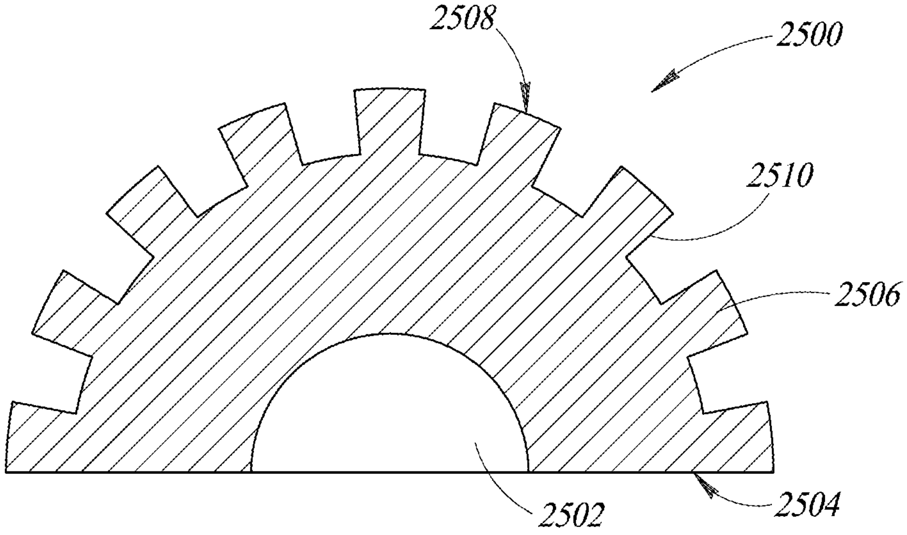
FIG. 25 is a cross-sectional view of an alternative implementation of a massage device according to an implementation of the present disclosure.

FIG. 25 is a cross-sectional view of an alternative implementation of a massage device 2500, which is similar to the massage device described with respect to at least FIG. 23. There is a hollow portion 2502 in a central area of a bottom surface 2504. The hollow portion 2502 could be larger or smaller than shown. A plurality of truncated protrusions 2506 extend from the device 2500. An external surface 2508 of the protrusions is rectangular. Sidewalls 2510 of the protrusions 2506 can be straight or curved. The device 2500 is formed from firm, resilient material, such as foam or rubber that can support a human body without collapsing.

The protrusions 2506 can be a plurality of evenly spaced protrusions 2506 around the entire device 2500 or can be ridges that encircle the entire device 2500. For example, the top surface of each protrusion 2506 can have a length that is in the range of 1.0-3.0 centimeters and a width in the range of 0.5-1.0 centimeters. If the ridges are formed, each ridge will have a single top surface that forms a ring around the device 2500.

Figure 26A:
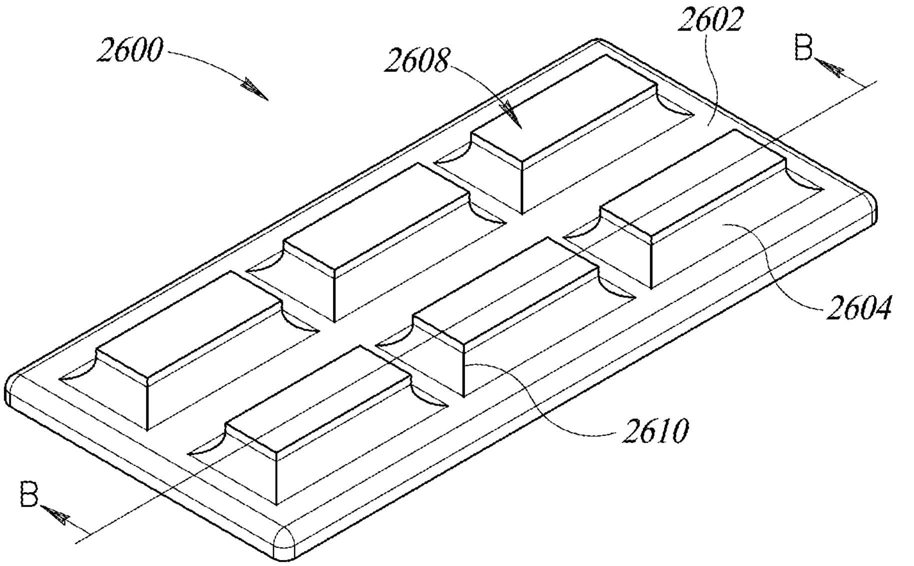
FIGS. 26A and 26B are a pictorial and a cross-sectional view of an alternative implementation of a massage device according to implementations of the present disclosure.
Figure 26B:
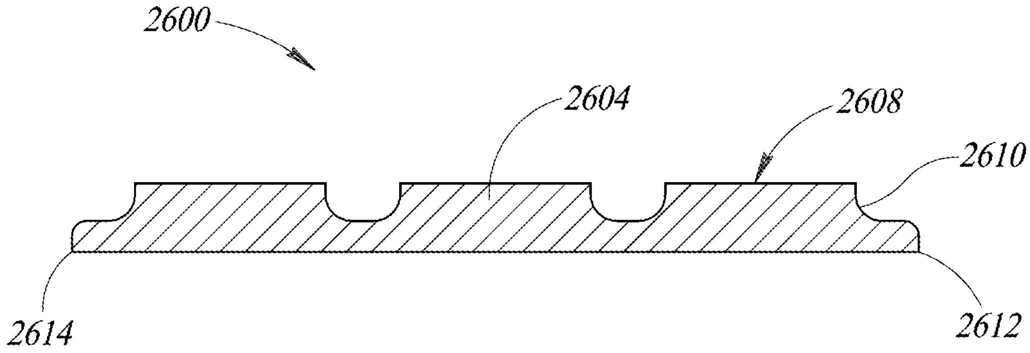

FIG. 26A is a pictorial view of a massage device 2600 that includes a plurality of protrusions 2604 that extend from a surface 2602. FIG. 26B is a cross-sectional view of the device 2600 in FIG. 26A through the line B-B. The massage device 2600 is similar to the devices in FIGS. 20-25, and it is formed to be attached to a foam roller. A strap or other attachment band is coupled to ends 2612 and 2614 of the device 2600 to allow the device 2600 to be coupled to a foam roller. The device 2600 is preferably formed of a material that can conform to a curvature of a roller. Alternatively, the device 2600 can be formed to have a curvature that matches an associated roller. The strap or other bands can be coupled in various ways, such as those described above.

The plurality of protrusions 2604 are illustrated as having curved sidewalls 2610 that couple to a rectangular top surface 2608. The top surface 2608 can be square or can be curved. In addition, the sidewalls 2610 can be perpendicular to the surface 2602 instead of being curved. The protrusions 2604 are preferably evenly spaced in rows and columns.

Figure 27:
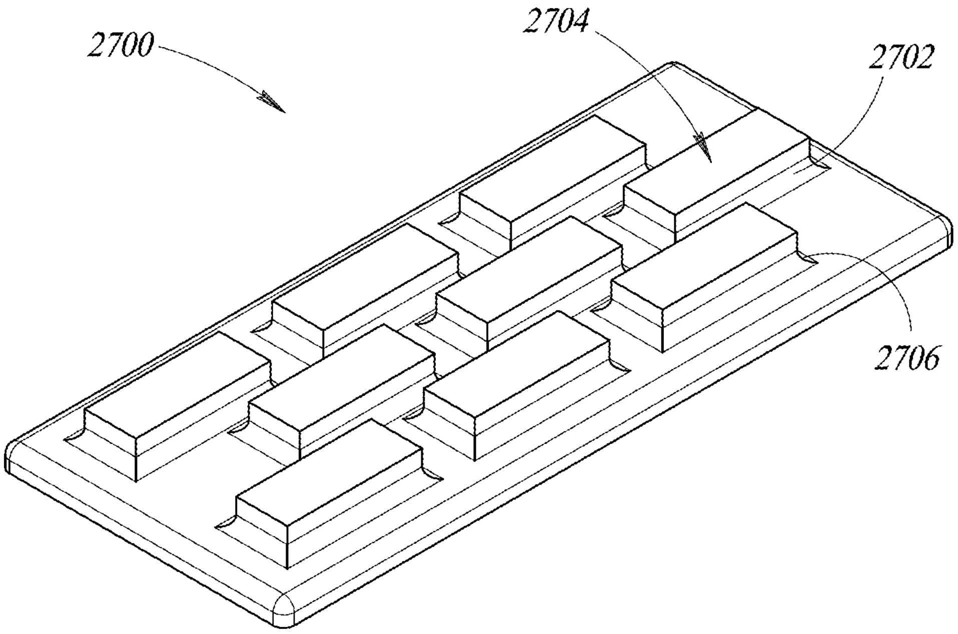
FIG. 27 illustrates an alternative implementation of a massage device according to implementations of the present disclosure.

FIG. 27 is a pictorial view of an alternative implementation of a massage device 2700. It is similar to the device 2600 of FIG. 26; however, a plurality of protrusions 2702 are arranged in rows that are not aligned, but are staggered with respect to each other. This increases a density of the protrusions 2702, i.e., the number of protrusions 2702 per area. The protrusions 2702 have curved sidewalls 2706. In other implementations, the sidewalls 2706 could be straight. The protrusions 2702 are truncated, such that a top surface 2704 is flat. In this implementation, they are rectangular, however, they could be square, circular, triangular, or any other shape. In addition, they could be pointed or rounded instead of having a flat top surface 2704. Various patterns and shapes of these protrusions are envisioned.

Figure 28:
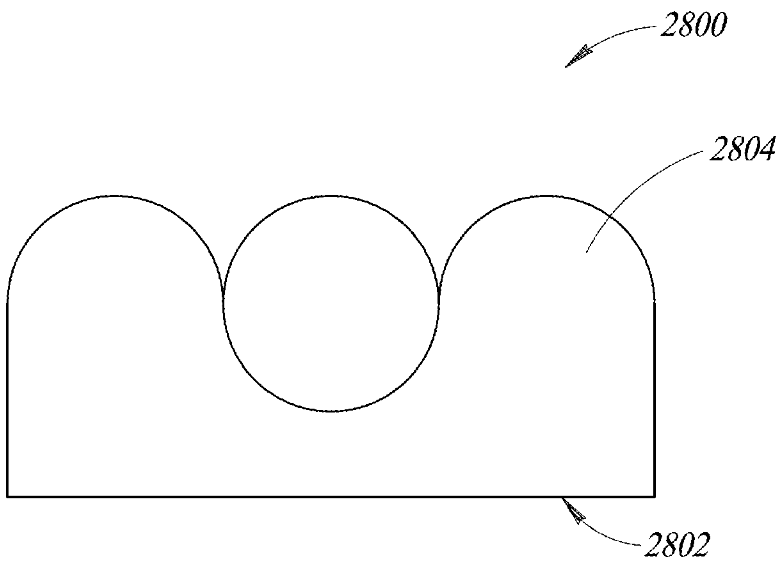
FIGS. 28 and 29 are cross-sectional views of alternative implementations of a massage device according to implementations of the present disclosure.

FIG. 28 is a side view of an alternative implementation of a massage device 2800 that is attachable to a foam roller, such as the implementations described above. Alternatively, this device may be used on a flat surface like a wall or the floor. This device 2800 includes a plurality of large protrusions 2804 that have peaks and valleys. These are large curved protrusions 2804 that extend from a bottom surface 2802 of the device 2800 and generally have a height in the range of 1-3 inches and a base width in the range of 1-3 inches. There are three protrusions 2804 shown, two in the foreground and one in the background. Different arrangements are envisioned.

In one implementation, the bottom surface 2802 is flexible such that it can curve around a foam roller. In another implementation, the bottom surface 2802 is configured to grip a wall or floor to hold the device in place as the user applies pressure with their body. Instead of three large curved protrusions, there may be two protrusions side by side. For example, the dimensions may correspond to two tennis balls. The arrangement of large protrusions may be incorporated in the devices described above, which may include the hollow central portions and an optional base.

Figure 29:
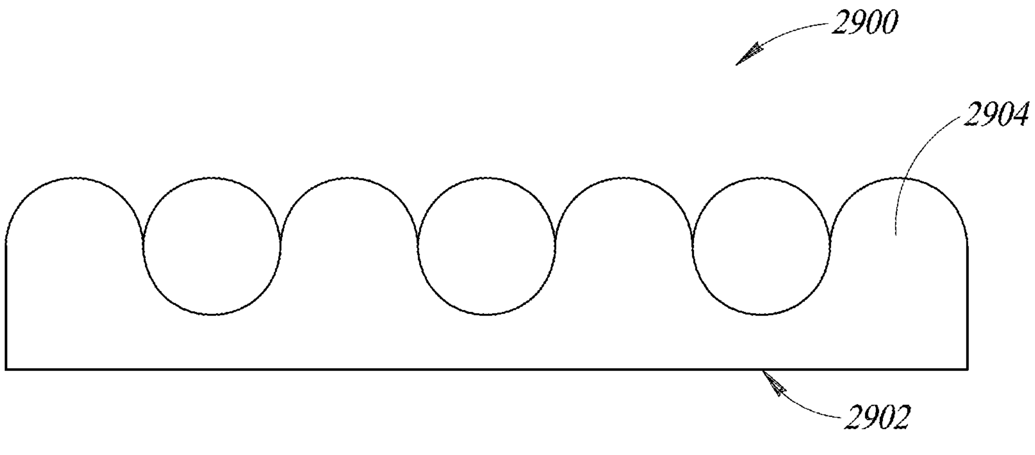

FIG. 29 is a side view of an alternative implementation of a massage device 2900 including a plurality of protrusions 2904. The protrusions 2904 can have consistent shapes and sizes. There are preferably a plurality of rows of the protrusions 2904 that continue along the device. A first row of the protrusions 2904 is in the foreground and a second row of the protrusions 2904 is in the background. The protrusions 2904 extend from a surface 2902 of the device 2900. The surface 2902 is flexible to allow it to conform to a curvature of a foam roller. Alternatively, the surface 2902 can be formed to have a curvature that corresponds to an associated foam roller. The protrusions 2904 generally have a height from the surface 2902 that is in the range of 1 to 4 inches. The center-to-center distance between protrusions is ideally in the range of 1-6 inches.

Figure 30:
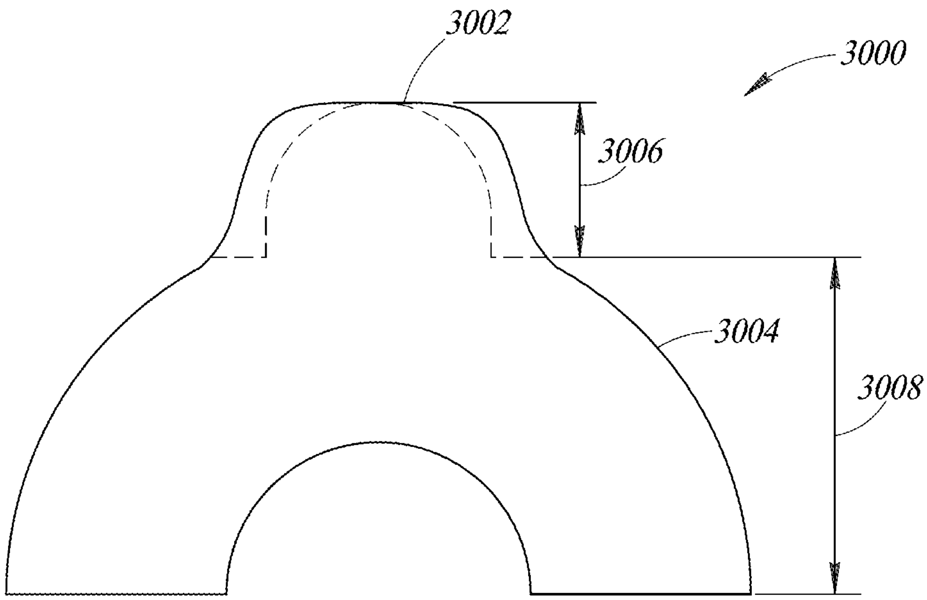
FIG. 30 is a cross-sectional view of an alternative implementation of a massage device.

FIG. 30 is a cross-sectional view of an alternative implementation of a massage device 3000 similar to the devices described above. The device 3000 includes a single rounded protrusion 3002 extending from sidewalls 3004. The protrusion is shown to gradually extend from the sidewalls. The dashed lines show are more abrupt extension out of the sidewalls. A height 3006 of the protrusion is in the range of 0.5 and 1 inches. A height 3008 of the device is in the range of 2.5 and 6 inches.

Different patterns and shapes of protrusions can be added to any of the implementations described herein. For example, the exterior surface that interacts with the user may have a plurality of triangularly or pyramid shaped protrusions that are small in comparison to a height of the device. A ratio of the height of the device to a height of each protrusion from the exterior surface may be in the range of 10:1 to 20:1. The protrusions may each be rounded. The protrusions may be spaced from each other on the exterior surface or there may be formed to overlap each other. The protrusions may also be flexible, while remaining resilient, where they return to their original shape when pressure is removed. Various attachments, straps, or bands can be coupled to these different devices to couple them to foam rollers. Alternatively, these devices can be used on a flat surface without attachment to other devices.

The materials used to form these devices grip a user's skin, muscles, and fascia and create friction to massage the user. The grip and friction relieve tension, create more blood flow, and aid the user in massaging their own muscles and fascia. These materials are configured to temporarily deform in response to pressure, however, the deformation is slight to continue to support the user and apply sufficient pressure to provide massage.

The devices described herein may include a hollow interior to reduce cost and weight of the device. The hollow interior can also provide for more flexibility of the bottom surface to conform to the surface on which it is placed.

In some implementations, these devices can be formed from a material that is textured such that the protrusions are a first large format change in dimension and the texture of the material is a small format change in material.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A massage device, comprising:

a main body having a bottom end portion and a top end portion, the bottom end portion having a bottom surface defined by an outermost edge;

a first recess in the bottom surface of the main body and having a first volume;

a second recess in the bottom surface of the main body, the second recess having a second volume less than the wherein each of the first recess and the second recess are defined by inner sidewalls of the main body; a peripheral ridge extending laterally outward from the outermost edge of the bottom end portion of the main body, the top end portion of the main body including an uppermost surface and the main body tapering from the peripheral ridge to the uppermost surface of the top end portion of the main body; and a base portion including:

an outermost edge and an innermost edge spaced across from and opposite to the outermost edge;

an outer lip extending from the outermost edge of the base portion, the outer lip having a longitudinal portion and a lateral portion extending radially inward from the longitudinal portion toward the innermost edge of the base portion; a curved inner lip including a longitudinal portion extending upward from the innermost edge of the base portion, the longitudinal portion of the curved inner lip structured to engage the inner sidewalls of the first recess; a protrusion configured to be received in the second recess in the bottom surface of the main body; and an opening through the base portion corresponding to the first recess in the bottom surface of the main body, wherein the outer lip of the base portion is configured to engage the peripheral ridge of the main body to removably couple the base portion to the main body.

2. The massage device of claim 1 wherein the outer lip of the base portion is positioned laterally outward from the main body.

3. The massage device of claim 1 wherein the top surface of the main body has an elongated planform shape with a central linear portion and curved ends.

4. The massage device of claim 1 wherein the protrusion of the base portion includes a first strip of material extending from the base portion and at least one second strip of material centered on the first strip and extending laterally relative to the first strip.

5. The massage device of claim 1 wherein the longitudinal portion of the curved inner lip is shorter than the longitudinal portion of the outer lip.

6. The massage device of claim 1 wherein the main body is coupleable to the base portion with the protrusion frictionally engaged with the inner sidewalls of the second recess.

7. The massage device of claim 1, wherein the protrusion has a first height and the longitudinal portion of the outer lip of the base portion has a second height less than the first height.

8. The massage device of claim 1 wherein the opening through the base portion is positioned centrally with respect to the base portion and the first recess is exposed to an external environment through the opening.

9. The massage device of claim 1, wherein the massage device has a substantially square planform shape with rounded corners.

* * * * *